US012664560B2

(12) United States Patent
Cole

(10) Patent No.: US 12,664,560 B2
(45) Date of Patent: Jun. 23, 2026

(54) CARBON EMISSION REDUCTION USING MACHINE LEARNING

(71) Applicant: ADP, Inc., Roseland, NJ (US)

(72) Inventor: Ramsay Cole, Roseland, NJ (US)

(73) Assignee: ADP, Inc., Roseland, NJ (US)

( * ) Notice: Subject to any disclaimer, the term of this patent is extended or adjusted under 35 U.S.C. 154(b) by 44 days.

(21) Appl. No.: 18/656,369

(22) Filed: May 6, 2024

(65) Prior Publication Data

US 2025/0342483 A1     Nov. 6, 2025

(51) Int. Cl.
| | |
|---|---|
| *G06Q 30/018* | (2023.01) |
| *G06Q 10/087* | (2023.01) |
| *G06Q 10/10* | (2023.01) |
| *G06Q 30/02* | (2023.01) |
| *G06Q 30/06* | (2023.01) |

(52) U.S. Cl.
CPC .................................. *G06Q 30/018* (2013.01)

(58) Field of Classification Search
CPC .................................................... G06Q 30/018
USPC .................................. 705/1.1, 317, 320, 321
See application file for complete search history.

(56) References Cited

U.S. PATENT DOCUMENTS

| | | | | |
|---|---|---|---|---|
| 2009/0204916 | A1* | 8/2009 | Benedek ............... | G06F 1/3203 715/764 |
| 2011/0213733 | A1* | 9/2011 | Cail, II .................. | G06Q 99/00 705/500 |
| 2014/0114867 | A1* | 4/2014 | Volkmann .............. | G06Q 10/30 705/308 |

| | | | | |
|---|---|---|---|---|
| 2021/0010816 | A1* | 1/2021 | Schmelzer ............. | G06Q 50/40 |
| 2023/0289911 | A1* | 9/2023 | Freier .............. | G06Q 10/06393 |
| 2023/0341271 | A1* | 10/2023 | Whear ................... | G01K 3/005 |
| 2024/0019827 | A1* | 1/2024 | Li ........................ | G05B 19/042 |
| 2024/0127264 | A1* | 4/2024 | Nguyen ............. | G01C 21/3469 |
| 2024/0160956 | A1* | 5/2024 | Russo ................... | G06N 3/045 |
| 2024/0412227 | A1* | 12/2024 | Chang ................. | G06Q 30/018 |

FOREIGN PATENT DOCUMENTS

| | | | | | |
|---|---|---|---|---|---|
| WO | WO-2014201551 | A1 * | 12/2014 | ............. | G06Q 30/02 |

OTHER PUBLICATIONS

Kayla Ferguson. "When Should You Delete Outliers from a Data Set?". Mar. 6, 2018. Retrieved from https://humansofdata.atlan.com/2018/03/when-delete-outliers-dataset/ (Year: 2018).*

* cited by examiner

*Primary Examiner* — Jonathan P Ouellette

(74) *Attorney, Agent, or Firm* — Foley & Lardner LLP

(57) ABSTRACT

Carbon emission reduction using machine learning is provided. A system receives data for profiles linked with locations of an entity. The system determines, based at least in part on data from a utility service provider system and the data indicative of energy consumption associated with the locations, a first value of a metric indicative of carbon emissions associated with the locations. The system determines, based on a comparison of the first value of the metric with a threshold, to invoke an automated process via the payroll processing system to reduce the metric. The system generates, generate, using one or more models trained with machine learning, an action to execute via the automated process. The system selects a first profile from that is compatible with the action, and commands the payroll processing system to execute the generated action to cause a reduction in the first value of the metric.

20 Claims, 7 Drawing Sheets

200

300

400

600

705

715

710          710          710

CARBON EMISSION REDUCTION USING MACHINE LEARNING

TECHNICAL FIELD

This application is generally related to computing technology, and particularly to analysis and reduction of carbon emissions for one or more locations of an entity, and generation of actions to reduce the carbon emissions for the one or more locations of the entity.

BACKGROUND

Performing actions using energy generated from fossil fuel sources can result in emitting greenhouse gases, including, for example carbon dioxide. Due to the increasingly varying types of actions or functions performed at an entity, or the large number of such actions or functions that are performed at an entity, it can be challenging to determine how to control actions to reduce carbon emissions without negatively impacting the functioning of the entity.

SUMMARY

Aspects of the technical solutions described herein can be directed to reducing carbon emissions using machine learning. For example, the technical solution can store, retrieve, or process different types of data across different systems, and use machine learning to identify and analyze the factors that contribute to carbon emissions of the entity. To do so, a system of this technical solution can receive data from a payroll system and a utility grid, which can indicate carbon emissions associated with a location of the entity. The system can correlate the data from the payroll system with the data from the utility grid to generate an action to perform at the location of the entity that is configured to reduce carbon emissions at the location of the entity. Thus, systems and methods of this technical solution can process particular data to generate actions to reduce carbon emissions, thereby improving the efficiency with which functions are performed using technical infrastructure at a location of entity.

Aspects of the technical solutions disclosed herein can be directed to a system. The system can include one or more processors, coupled with memory. The one or more processors can receive data for each of a plurality of profiles linked with one or more locations of an entity. The data processing system can receive the data from a payroll processing system. The data can indicate energy consumption associated with the one or more locations of the entity. The one or more processors can determine, based at least in part on data from a utility service provider system and the data indicative of energy consumption associated with the one or more locations of the entity, a first value of a metric indicative of carbon emissions associated with the one or more locations of the entity. The one or more processors can determine, based on a comparison of the first value of the metric with a threshold, to invoke an automated process via the payroll processing system to reduce the metric. The one or more processors can generate, using one or more models trained with machine learning on historical data received from the payroll processing system and historical data received from the utility service provider system, an action to execute via the automated process that is configured to reduce the first value of the metric. The one or more processors can select, using the one or more models, a first profile from the plurality of profiles that is compatible with the generated action. The one or more processors can command, via the automated process, the payroll processing system to execute the generated action for the selected first profile to cause a reduction in the first value of the metric.

In some implementations, the one or more processors can determine, via the automated process, a benefit correlated to the selected first profile. The one or more processors can command, via the automated process, responsive to performance of the action, the payroll processing system to execute a second action associated with the benefit.

The one or more processors can identify, based at least in part on the data indicative of energy consumption associated with the one or more locations of the entity and the data from the utility service provider system, a second value of a second metric indicative of computing resource utilization of the one or more locations of the entity. The one or more processors can generate, using the one or more models, a second action to execute via the automated process that is configured to reduce the second value of the second metric. The one or more processors can select, using the one or more models, a second profile from the plurality of profiles that is associated with the one or more locations of the entity. The one or more processors can command, via the automated process, the payroll processing system to execute the generated second action for the selected second profile to cause a reduction in the second value of the second metric.

The data indicative of energy consumption associated with the one or more locations of the entity can include at least one of energy consumption metrics, carbon offset initiatives established by the entity, payroll data elements, employment turnover metrics, transportation metrics, or supply chain metrics.

The one or more processors can determine, using the one or models, an industry of the entity. The one or more processors can determine, using natural language processing, the threshold based on one or more benchmarks indicative of carbon emission standards for the industry. In some cases, the one or more processors can determine, using the natural language processing, a second benchmark indicative of carbon emission standards for the one or more locations of the entity. The one or more processors can select, using the one or more models, the threshold according to the one or more benchmarks and the second benchmark.

The one or more processors can determine, based at least in part on the data from the utility service provider system and the data indicative of energy consumption associated with the plurality of profiles linked with the one or more locations of the entity, a second value of the metric, wherein the second value of the metric is less than the first value of the metric. The one or more processors can generate, based on a comparison of the second value of the metric with the threshold, a second action to cause a further reduction in the metric.

The one or more processors can identify, using the one or more models, a second profile from the first profile, the first profile having a plurality of profiles. The one or more processors can determine, using the one or more models, a second value of the metric indicative of carbon emissions associated with the selected second profile. The one or more processors can generate, based on a second comparison of the second value of the metric and the generated action, a second action that is configured to reduce the second value of the metric. The one or more processors can execute the second generated action for the second profile. The one or more processors can command, via the automated process, the payroll processing system to replace the generated action with the second generated action to cause the reduction in the carbon emissions associated with the one or more locations of the entity linked with the selected first profile.

The one or more processors can determine, using the one or more models, an impact on the first value of the metric associated with the one or more locations of the entity caused by an application of the generated action to the one or more locations of the entity.

The one or more processors can receive, from the payroll processing system, second data for each of the plurality of profiles linked with the one or more locations of the entity. The second data can be indicative of energy consumption associated with the one or more locations of the entity subsequent to completion of the action. The one or more processors can determine, based at least in part on second data from the utility service provider system and the second data indicative of energy consumption associated with the one or more locations of the entity, a second value of the metric. The one or more processors can compare, using the one or more models, the second value of the metric with the threshold. The one or more processors can generate, using the one or more models, a new action to execute via the automated process subsequent to a determination that the second value of the metric is greater than the threshold. The one or more processors can select, using the one or more models, a second profile from the plurality of profiles that is compatible with the generated new action. The one or more processors can command, via the automated process, the payroll processing system to execute the generated second action to the selected second profile to cause a second reduction in the second value of the metric.

The one or more processors can receive, from the payroll processing system, second data indicative of energy consumption associated with the one or more locations of the entity. The one or more processors can determine, based in part on data from the utility service provider system and the second data indicative of energy consumption associated with the one or more locations of the entity, an impact to the first value of the metric. The one or more processors can display, via a graphical user interface, the impact.

The one or more processors can generate, using the one or more models, a plurality of actions that are configured to reduce the first value of the metric. The one or more processors can determine, using the one or more models, an impact to the first value of the metric for each of the plurality of actions. The one or more processors can display, via a graphical user interface, the plurality of actions as a plurality of graphical user elements. Each of the plurality of graphical user elements can correspond to one of the plurality of actions. The one or more processors can arrange, via the graphical user interface, the plurality of graphical user elements according to the impact to the first value of the metric determined for each of the plurality of actions. The one or more processors can receive, via the graphical user interface, a selection of one of the plurality of graphical user elements.

The one or more processors can analyze, using the one or more models, the data indicative of energy consumption associated with the one or more locations of the entity or the data from the utility service provider system to determine an inconsistency within the data indicative of energy consumption associated with the one or more locations of the entity or the data from the utility service provider system. The one or more processors can remove, using the one or more models, the inconsistency from the data indicative of energy consumption associated with the one or more locations of the entity or the data from the utility service provider system to cleanse the data indicative of energy consumption associated with the one or more locations of the entity or the data from the utility service provider system.

Aspects of the technical solutions described herein can be directed to a method. The method can be performed by one or more processors, coupled with memory. The method can include the one or more processors receiving, from a payroll processing system, data for each of a plurality of profiles linked with one or more locations of an entity. The data can be indicative of energy consumption associated with the one or more locations of the entity. The method can include the one or more processors determining, based at least in part on data from a utility service provider system and the data indicative of energy consumption associated with the one or more locations of the entity, a first value of a metric indicative of carbon emissions associated with the one or more locations of the entity. The method can include the one or more processors determining, based on a comparison of the first value of the metric with a threshold, to execute an automated process via the payroll processing system to reduce the metric. The method can include the one or more processors generating, using one or models trained with machine learning on historical data received from the payroll processing system and historical data received from the utility service provider system, an action to execute via the automated process that is configured to reduce the first value of the metric. The method can include the one or more processors selecting, using the one or more models, a first profile from the plurality of profiles that is compatible with the generated action. The method can include the one or more processors commanding, via the automated process, the payroll processing system to execute the generated action to the selected first profile to cause a reduction in the carbon emissions associated with the one or more locations of the entity linked with the selected first profile.

Aspects of the technical solutions described herein can be directed to a non-transitory computer-readable medium comprising instructions embodied thereon. The instructions, when executed by one or more processors, can cause the one or more processors to receive, from a payroll processing system, data for each of a plurality of profiles linked with one or more locations of an entity. The data can be indicative of energy consumption associated with the one or more locations of the entity. The instructions can cause the one or more processors to determine, based at least in part on data from a utility service provider system and the data indicative of energy consumption associated with the one or more locations of the entity, a first value of a metric indicative of carbon emissions associated with the one or more locations of the entity. The instructions can cause the one or more processors to determine, based on a comparison of the first value of the metric with a threshold, to execute an automated process via the payroll processing system to reduce the metric. The instructions can cause the one or more processors to generate, using one or more models trained with machine learning on historical data received from the payroll processing system and historical data received from the utility service provider system, an action to execute via the automated process that is configured to reduce the first value of the metric. The instructions can cause the one or more processors to select, using the one or more models, a first profile from the plurality of profiles that is compatible with the generated action. The instructions can cause the one or more processors to command, via the automated process, the payroll processing system to execute the generated action for the selected first profile to cause a reduction in the first value of the metric.

BRIEF DESCRIPTION OF THE DRAWINGS

Aspects of the technical solutions are described in the detailed description which follows, in reference to the noted plurality of drawings by way of non-limiting examples of exemplary embodiments of the technical solutions described herein.

DETAILED DESCRIPTION

Figure 1:
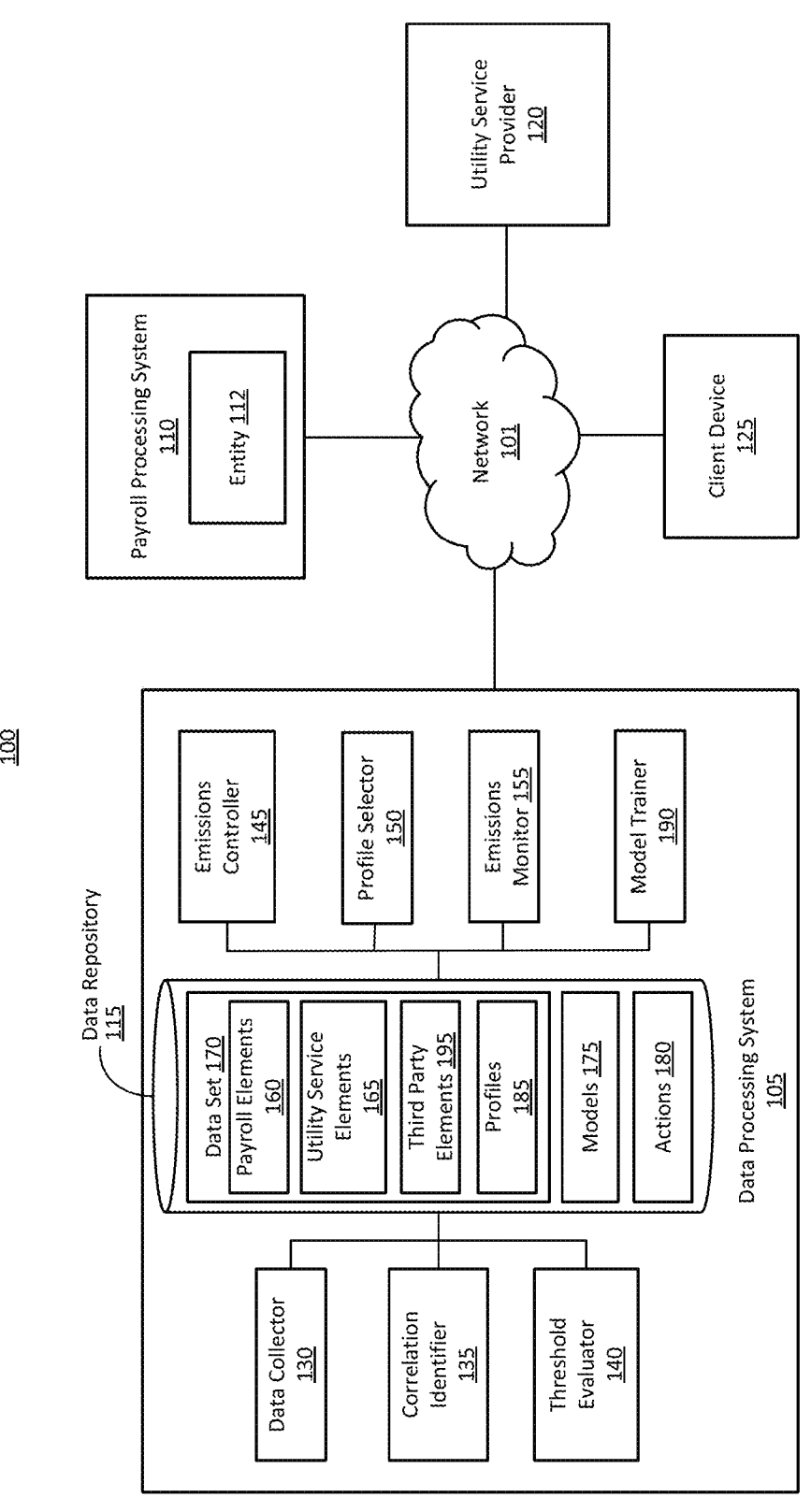
FIG. 1 depicts an illustrative system to reduce carbon emissions using machine learning, in accordance with some implementations.

Following below are more detailed descriptions of various concepts related to, and implementations of, methods, apparatuses, and systems to reduce carbon emissions using machine learning. The various concepts introduced above and discussed in greater detail below can be implemented in any of numerous ways.

Aspects of the technical solutions described herein are directed to reducing carbon emissions using machine learning. Aspects of the technical solutions described herein are generally directed to determining carbon emissions for one or more locations and generating actions to reduce the carbon emissions at the one or more locations. To do so, and for example, a system of the technical solutions can use data from a payroll processing system to and data from a utility grid to determine carbon emission associated with a location of an entity. The system can determine, based at least in part on data from a utility service provider system and the data indicative of energy consumption associated with the one or more locations of the entity, a first value of a metric indicative of carbon emissions associated with the one or more locations of the entity. The system can determine, based on a comparison of the first value of the metric with the threshold, to execute an automated process via the payroll processing system to reduce the metric. The system can generate, using one or more models trained with machine learning on historical data received from the payroll processing system and historical data received from the utility service provider system, an action to execute via the automated process that is configured to reduce the first value of the metric. The system can select, using the one or more models, a first profile from the plurality of profiles that is compatible with the generated action. The system can command, via the automated process, the payroll processing system to execute the generated action for the selected first profile to cause a reduction in the first value of the metric.

It can be technically challenging for an entity to control, reduce, or otherwise manage carbon emissions associated with locations of the entity. For example, it can be challenging to accurately determine carbon emissions for the one or more locations of the entity, which may be due, at least in part, to i) the lack of access to relevant data, information, or metrics, ii) the inability to efficiently, accurately, or reliably process, analyze, classify, or categorize such data in order to generate useful metrics; or iii) the inability to generate actions based on the metrics that are designed, constructed or operational to reduce carbon emissions generated by the one or more locations of the entity.

Aspects of the technical solutions described herein can access, receive, retrieve or otherwise obtain information from various data sources, including utility grid providers and payroll processing systems. The technical solution can use machine learning techniques to determine, from the plurality of data sources, a carbon emissions value for the one or more locations of the entity. Aspects of the technical solutions described herein can determine, from the carbon emissions value for the one or more locations of the entity and the plurality of data sources, components of the carbon emissions value for one or more profiles of the one or more locations of the entity. For example, aspects of the technical solutions described herein can determine a component of the carbon emissions value for a profile of a location of an entity, wherein the profile is the profile of a single employee. Aspects of the technical solutions described herein can analyze the data from the plurality of data sources to determine how much carbon emissions the employee creates on a day to day basis, such as by commuting to and from work, how much carbon emissions are created by the employee's use of computing resources in a day. Aspects of the technical solutions described herein can determine how much carbon emissions are created by the entity by employing the employee, such as the payroll frequency, the benefits and perks offered to the employee, or any payroll deductions. Aspects of the technical solutions described herein can analyze additional data points such as salary and demographic data for the employee.

By analyzing the different contributing factors to the component of the carbon emissions value for the employee (e.g., the one or more profiles of the one or more locations of the entity), aspects of the technical solutions described herein can determine an action for the profile to reduce its component of the carbon emissions, such as to take public transit to work instead of driving. Further, aspects of the technical solutions described herein can determine a benefit correlated to the profile and assign the benefit to the profile upon completion of the action. For example, where the action is for the employee to take public transit instead of commuting, the benefit can be a financial reward to the employee for taking public transit.

In an illustrative example, the technical solution can use machine learning to analyze various factors associated with a location of entity, including, for example, energy consumption, resource utilization on a per-role basis, and job responsibilities. The technical solution can determine, compute, estimate, or otherwise predict or identify a carbon footprint attributed to the role based on these factors. Thus, the technical solution can integrate payroll, job role, and environmental impact data to generate a holistic metric of the carbon footprint of each role. The technical solution can utilize machine learning or artificial intelligence models (e.g., neural networks, deep learning, support vector machines, or reinforcement learning using Q-learning or policy gradient methods) to analyze the data to quantify the environmental impact of different job roles, considering factors such energy usage, transportation, and resource consumption. The technical solution can generate an action to reduce or otherwise manage the carbon emissions, such as by adjusting profiles associated with a role in a manner that reflects the environmental impact of the role, thereby reducing carbon footprint or emissions of the entity. The technical solution can generate customized graphical user interface dashboards with insights into carbon emissions or footprint associated with a particular role, and provide recommended or generated actions for reducing the carbon footprint.

FIG. 1 depicts an example system 100 to reduce carbon emissions using machine learning, in accordance with implementations. The system 100 can include a data processing system 105. The data processing system 105 can include one or more processors coupled with memory. The system 100 can include, interface with, access, communicate with or otherwise utilize one or more of a payroll processing system 110, utility service provider 120, or client device 125. The data processing system 105 can include, access, or otherwise utilize a data collector 130 that is designed, constructed and operational to receive, request, access, or otherwise obtain data that facilitates reducing carbon emissions. The data processing system 105 can include, access or otherwise utilize a correlation identifier 135 designed, constructed or operational to determine metrics associated with a carbon footprint based on the data. The data processing system 105 can include, access or otherwise utilize a threshold evaluator 140 designed, constructed and operational to determine a threshold or compare metrics with the threshold. The data processing system 105 can include, access or otherwise utilize an emissions controller 145 designed, constructed and operational to generate actions configured to control carbon emissions. The data processing system 105 can include, access or otherwise utilize a profile selector 150 designed, constructed and operational to select a profile to which to apply the generated action. The data processing system 105 can include, access or otherwise utilize an emissions monitor 155 designed, constructed and operational to monitor, measure, or otherwise determine carbon emissions of the entity. The data processing system 105 can include, access or otherwise utilize a model trainer 190 designed, constructed and operational to train models using machine learning, obtain feedback associated with performance of the models, and update the models using machine learning and based on the feedback.

The data processing system 105 can include a data repository 115. One or more systems or components of the data processing system 105 can interface with or access the data repository 115. The data repository 115 can include a data set 170. The data set 170 can include one or more of payroll elements 160, utility service elements 165, third party elements 195, or profiles 185. The data repository 115 can include models 175, such as models trained by the model trainer 190 using machine learning. The data repository 115 can include actions 180, such as actions generated or used by the emissions controller 145.

The data processing system 105 can include at least one logic device such as payroll processing system 110. The payroll processing system 110 can be a computing device having a processor to communicate via a network 101. The data processing system 105 can include or interface with at least one payroll processing system 110. The payroll processing system 110 can be a computation resource, server, processor or memory. For example, the data processing system 105 can include a plurality of computation resources or processors. The payroll processing system 110 can facilitate communications between the data processing system 105, the data repository 115, or the client device via the network 101. The payroll processing system 110 can be part of or included the data processing system 105. The payroll processing system 110 can be remote from the data processing system 105. The payroll processing system 110 can include an entity data structure 112. In some cases, the payroll processing system 110 on the premises of a location of the entity.

Each component of the data processing system 105 (e.g., the data collector 130, the correlation identifier 135, the threshold evaluator 140, the emissions controller 145, the profile selector 150, the emissions monitor 155, the model trainer 190, or the data repository 115), can communicate with each other to perform a function. In some aspects, each subcomponent can be located on a separate server or on one or more subcomponents are located on the same server. In some aspects of the technical solutions described herein, each subcomponent corresponds to a processor of the data processing system, or one or more subcomponents has their functionalities executed by the same processors. In some aspects, the subcomponents of the data processing system 105 can operate or execute on the client device 125. For example, in some aspects of the technical solutions described herein, the operations of the data processing system 105 operate on or are performed by an application operating on the client device 125.

In some aspects, the client device 125 performs one or more of the functionalities of the data processing system 125, such as the functionalities associated with the data collector 130, the correlation identifier 135, the threshold evaluator 140, the emissions controller 145, the profile selector 150, the emissions monitor 155, the model trainer 190, or the data repository 115). For example, the client device 125 executes an application to perform some or all of the functionalities of the data collector 130, or the client device includes the data collector 130. In some aspects of the technical solutions described herein, the client device 125 includes one or more subcomponents of the data processing system 105, such as one or more of the data collector 130, the correlation identifier 135, the threshold evaluator 140, the emissions controller 145, the profile selector 150, the emissions monitor 155, the model trainer 190, or the data repository.

The client device 125 is or includes any computing device such as a laptop, a desktop computer, a smart phone, a tablet, etc. A user may operate, display, or otherwise execute an application via the client device 125. The client device 125 can be coupled with storage or memory. In some aspects of the technical solutions described herein, the client device 125 is operated by a user associated with an organization to perform various tasks associated with the organization. The client device 125 executes one or more applications. The application is any platform for performing the various tasks associated with the organization, such as low-code platform, no-code platform, software-as-a-service platform (SaaS), web application, web browser, desktop application, among others. In some aspects of the technical solutions described herein, the application is or includes an electronic transaction system for maintaining a data set to perform a transaction.

The payroll processing system 110 can perform one or more functions relating to payroll for an entity 112. The entity 112 can be includes an individual, such as an employee of an organization as described herein, or a grouping of people, such as an organization, corporation, or educational institution. The payroll processing system 110 can maintain information about the entity 112. The information includes data like name, address, social security number, salary, personally identifying information, demographic information, familial information, tax information, benefits information, or other such information. The entity 112 can have one or more geographic locations. For example, the payroll processing system 110 can be an external computing system maintaining a data repository of the average salary the average salary for employees of a specific entity. The payroll processing system 110 can store one or more types of data in the data repository 115. For example, the payroll processing system 110 can generate and/or monitor various payroll elements 160 and store them in the data repository 115.

The payroll processing system 110 can generate one or more profiles 185 corresponding to the one or more locations of the entity 112. The payroll processing system 110 can generate one or more profiles 185 for one or more organizational units of the entity 112. For example, where the entity is a global corporation having offices in multiple countries, the payroll processing system 110 can generate a profile 185 corresponding to the entire global corporation. The payroll processing system 110 can generate a profile 185 for each geographic location of an office of the entity 112. The payroll processing system 110 can generate a profile 185 for each organizational subunit (e.g., team) of the entity 112, such as, for example, marketing, production, or legal. The payroll processing system 110 can generate a profile 185 for each organizational subunit at a particular geographic location of the entity, such as marketing at one geographic location of the entity 112. The payroll processing system 110 can generate a profile 185 for each employee of the entity 112.

The payroll processing system 110 can perform one or more functions relating to payroll for the entity 112. For example, the payroll processing system 110 can perform payroll processing functions, human resource management functions, time and attendance tracking functions, benefits administration functions, talent management functions, or analytics and reporting functions, among others. The payroll processing system 110 can generate data relating to the payroll functions it performs, and store the data in the data repository as payroll elements 160.

The utility service provider 120 (sometimes hereinafter referred to as utility service provider(s) can deliver one or more utilities to one or more locations of the entity 112. An entity 112 can receive utilities from one or more utility service providers 120. One or more locations of the entity 112 can receive utilities from one or more utility service providers 120. For example, one or more utility service providers 120 can provide one or more locations of the entity 112 with utilities such as electricity, water, natural gas, or telecommunications networks. The utility service provider 120 can include one or more monitoring and control systems, composed of any combination of hardware and/or software to monitor the utilities provided by the utility service provider 120 to the one or more geographic locations of the entity 112. For example, the utility service provider 120 can utilize systems and/or methods such as Supervisory Control and Data Acquisition (SCADA), Distribution management systems (DMS), or metering and monitoring devices (e.g., smart meters and sensors), among others. The utility service provider 120 can implement smart grid technologies (such as advanced metering infrastructure (AMI) or distributed energy resources (DERs)). The utility service provider 120 implements one or more of the above methods to determine how much of the utility (or utilities) is provided by the utility service provider 120 to the one or more locations of the entity 112. The utility service provider 120 generates data about the amount of utility (or utilities) provided by the utility service provider 120 to the one or more locations of the entity 112. This data is stored in the data repository 115 as utility service elements 165.

The network 101 can be a wireless or wired connection for enabling the data processing system 105 to store, transmit, receive, or display information to identify, extract, and map a data set from a first type to a second type. The data processing system 105 can communicate with internal subcomponents (described herein), or external components (e.g., the payroll processing system 110, the utility service provider, or the client device 125, among others) via the network 101. The data processing system 105 can, for example, store data about the system in the data repository 115. The data processing system 105 can, for example, receive the data set 170 transmitted from the data repository 115. The network can include a hardwired connection (e.g., copper wire or fiber optics) or a wireless connection (e.g., wide area network (WAN), controller area network (CAN), local area network (LAN), or personal area network (PAN)). For example, the network 101 can include WiFi, Bluetooth, BLE, or other communication protocols for transferring over networks as described herein.

The data processing system 105 can include a data repository 115. The data repository 115 is any memory, storage, or cache for storing information or data structures of the system 100. The data repository 115 can include a non-transitory computer-readable medium. The data repository 115 allows data set 170 to be accessed by any components of the system 100, such as by communication methods described herein. The data repository 115 contains at least the data set 170, models 175, and actions 180. The data set 170 contains at least payroll elements 160, utility service elements 165, third party elements 170, or profiles 185, among others. The information in the data repository 115 is stored in any kind of memory, such as a cloud or hard drive. The data repository 115 includes, for example, random access memory (RAM), dynamic random access memory (DRAM), static random access memory (SRAM), error correcting code (ECC), read only memory (ROM), programmable read only memory (PROM), or electrically erasable read only memory (EEPROM). The information or data structures (e.g., tables, lists, or spreadsheets) contained within the data repository 115 are dynamic and change periodically (e.g., daily or every millisecond); via information from the server (e.g., through batch processing, real-time streaming, webhooks, scheduled cron jobs, incremental updates, database triggers, API requests, or version control systems, among others); via an input from a user (e.g., a user operating the client device 125); via information from the data repository 115, or the client device 125, transmitted through the network 101; via inputs from subcomponents of the data processing system 105, (the data collector 130, the correlation identifier 135, the threshold evaluator 140, the emissions controller, the emissions monitor 155, the model trainer 190, the data set 170, the models 175, or the actions 180) or via an external update to the system 100. For example, the models 175 within the data repository 115 change or are updated responsive to an indication from the model trainer 190.

The data repository 115 maintains the data set 170, the models 175, or the actions 180. The data set 170 (hereinafter referred to as data 170 or data set(s) 170) include a plurality of values. The data set 170 can be stored in the data repository 115 or the data repository 115. The values can be alpha-numeric. In some cases, the values are displayable on a screen, such as that of the client device 125, or the data processing system 105. For example, the data set 170 can include strings such as "First Name" or "Earnings" or "130,000" or "0.60." The data set 170 can include auditory values, such as a sound or a vocal recording. The data set 170 can include colored or color coded-values. The data set 170 can include time-related values, such as a current time, elapsed time, or clock-in time, among others. The data set 170 can include images. The values of the data set 170 include any combination of values. For example, a first value of the data set 170 includes an image and a string, and a second value of the data set 170 includes an auditory value. The values of the data set 170 can relate to each other. The data set 170 can be associated with a resource utilization of a location, role, or entity.

The data set 170 can include different attributes, such as file type, structure type, number of entities within the structure, nodes for the entities within the structure, or other such attributes. The data set 170 are included in, denoted by, or transmitted as an electronic file type. Examples of electronic file types include comma separated values (CSV), excel files (XLS or XLSM), or data interchange format (DIF), JavaScript Object Notation (JSON), among others. The data set 170 can be associated with or stored as a file type. The file determines or relates to data structures associated with the data set 170. In some technical solutions described herein, the data set 170 are encrypted by the data repository 115, such as by Advanced Encryption Standard (AES), Rivest-Shamir-Adleman (RSA), or another encryption standard. The data set 170 can be unencrypted by the payroll processing system 110, or by another system enabled for access to the data set 170, such as the data processing system 105. In some aspects of the technical solutions described herein, one or more client devices requests access to the data set 170 or requests data set 170 itself from the payroll processing system 110 via the data processing system 105 or through another computing system or the client device 125 directly. The data set 170 can be received from a client device 125 associated with the entity 112.

The data set 170 can includes payroll elements 160, utility service elements 165, third party elements 195, or profiles 185. Payroll elements 160 can be data received from the payroll processing system 110 for one or more locations of an entity. Payroll elements 160 can be for employees of the entity 112, including: salary, wages, bonuses, overtime pay, commissions, benefits and perks (e.g., health insurance coverage, retirement contributions, stock options, or wellness program participation, among others), payroll deductions (e.g., federal, state, or local taxes, social security contributions, healthcare contributions (e.g., Medicare contributions), or retirement plan contributions, among others), variable pay factors (e.g., performance-based bonuses, profit sharing distributions, or incentivized compensation, among others), or payroll frequency (e.g., monthly, bi-weekly, or weekly, among others), among others. Payroll data elements 160 can be for employers within the entity, including: employee compensation (e.g., total payroll expenses, salary distributions, bonus allocations, or benefits contributions, among others), payroll expenses (e.g., payroll taxes, social security contributions, or healthcare contributions (e.g., Medicare contributions)), compensation structure (e.g., compensation by job role, pay equity analysis, or variable pay distribution, among others), benefits analysis (e.g., cost of employee benefits, utilization rates for health insurance, or retirement plan participation, among others), or turnover metrics (e.g., employee retention rates, reasons for turnover, or cost of employee turnover).

Payroll elements 160 can include additional information about the one or more locations of the entity 112, including, for example: transportation data (e.g., commuting distance, vehicle types, or business travel records, among others), supply chain data (e.g., procurement records, supplier emissions data, or product lifecycle assessments, among others) environmental goals (e.g., sustainability reports for the one or more locations of the entity 112, carbon reduction targets, or renewable energy usage targets, among others), or carbon offset initiatives (e.g., carbon offset purchases, renewable energy investments, or reforestation projects, among others), employee wellness programs (e.g., participation rates, health and fitness data, or employee feedback and satisfaction scores, among others) among others. The payroll elements 160 received from the payroll processing system 110 can be data for each of a plurality of profiles 185 linked with the one or more locations of the entity 112.

Utility service elements 165 can be data received from the utility service provider 120 for one or more locations of the entity. Utility service elements 165 can be energy consumption data (e.g., utility bills, energy monitoring systems, or smart meters, among others), or waste production data (e.g., waste disposal records, recycling rates, or waste audits, among others), among others.

Third party data elements 195 can be data from sources other than the payroll processing system 110 or the utility service provider 120. For example, third party data elements can be environmental databases (e.g., Environmental Protection Agency (EPA) databases, carbon footprint calculators, or environmental impact assessments, among others), industry benchmarks for the industry of the entity 112 (e.g., average carbon emissions by industry or best practices for carbon reduction, among others), weather data for one or more locations of the entity (e.g., temperature, precipitation amounts, wind speed, or solar radiation, among others), geographic information for one or more locations of the entity 112 (e.g., location-based emissions factors, population density, urban vs rural classification, satellite data to measure cars in corporate parking lots, or cell phone data to track commutes, among others), market data (e.g., carbon credit prices, renewable energy market trends, or sustainability investment indices, among others), or academic research (e.g., studies on sustainable practices, behavioral economics research, employee engagement studies, among others), among others.

Profiles 185 can be data sets containing information about one or more locations of the entity 112, or one or more subunits of the entity 112. The profiles can be created and maintained by the payroll processing system 110. The profiles 185 can include financial information about the one or more locations of the entity 112, or personal information for employees of the entity 112.

The data processing system 105 can include a data collector 130 is designed, constructed, and operational to receive, identify, synchronize, or obtain the data set 170 or components of the data set 170 (e.g., payroll elements 160, utility service elements 165, third party elements 195, or profiles 185, among others) from the data repository 115. The data collector 130 can be any combination of hardware and software for collecting, storing, processing, identifying, synchronizing, or receiving information or the data set 170 or subcomponents of the data set from one or more sources (e.g., the payroll processing system 110 or the utility service provider 120, among others). The data collector 130 can receive data based on a time interval or responsive to a condition or an event. The data collector 130 can make a request for data responsive to a condition, event or other trigger. For example, the data collector 130 can request data on a periodic basis. The data collector can request data responsive to the emissions monitor 155 detecting a value for a carbon emissions metric and the threshold evaluator 140 comparing the value with a threshold.

The data collector 130 can receive data indicative of energy consumption associated with one or more locations of the entity 112, including, for example, energy consumption metrics, carbon offset initiatives established by the entity, payroll data elements, employment turnover metrics, transportation metrics, or supply chain metrics. Example energy consumption metrics can include kilowatt-hours, British thermal units, gigajoules, energy intensity, energy use intensity, peak demand, specific energy consumption, carbon intensity, or other energy performance indicators. An example carbon offset initiative can refer to or include a program or project designed to mitigate greenhouse gas emissions by reducing, avoiding, or sequestering an equivalent amount of carbon dioxide or other greenhouse gases elsewhere. In some cases, carbon offset initiative can include purchasing carbon credits. Carbon offset initiatives can include carbon offset purchases, renewable energy investments, or reforestation projects, for example. Payroll data elements can include salary, wages, bonuses, overtime pay, or commissions. Employment turnover metrics can include, for example, employee retention rates, reasons for turnover, or cost of employee turnover. Transportation metrics can include, for example, commuting distance for an employee, vehicle type, or business travel records. Supply chain metrics can include, for example, procurement records, supplier emissions data, or product lifecycle assessments. Additional types of data can include waste production (e.g., waste disposal records, recycling rates, or waste audits), environment goals (e.g., company sustainability reports, carbon reduction targets, or renewable energy use targets).

In some cases, the data collector 130 can receive a data stream that includes the payroll elements 160 transmitted from the payroll processing system 110. The data collector retrieves, queries for, aggregates, or otherwise obtains the data set 170 or subcomponents of the dataset from one or more sources (e.g., the payroll processing system 110 or the utility service provider 120) via the network 101, a non-transitory computer-readable medium (e.g., a flash drive, CD-ROM, external hard drive, or other such physical data transfer medium), or via inputs from a client device 125 associated with the data processing system 105.

The data collector 130 retrieves or receives the data set 170 or subcomponents of the data set 170 at regular or irregular intervals. In some aspects, receiving or retrieving the data set 170 refers to receiving the entire data set 170, or a subset or subcomponent of the data set, such as the payroll elements 160, the utility service elements 165, the third party elements 195, or the profiles 185). For example, the data collector 130 receives the entire data set 170 from one or more sources at once, or in correlated or non-correlated subsets. In some aspects, the data collector 130 aggregates the data set 170 or values of the data set 170 over a period of time. In some aspects, the data collector 130 receives or retrieves the data set 170 as values are updated or added. For example, the data collector 130 receives the values of the data set 170 responsive to the values of the data set 170 being changed, deleted, added, or otherwise modified by one or more of the sources (e.g., the payroll processing system 110 or the utility service provider 120, among others). In some aspects, the data collector 130 receives or retrieves the entire data set 170 upon a modification of the data set 170 by one of the sources, or receives only the modified values of the data set 170.

In some aspects, the data collector 130 receives or retrieves more than one data set 170 from a first source, such as the payroll processing system 110. For example, the data collector 130 receives a first data set from the payroll processing system 110 at a first time and a second data set from the payroll processing system 110 at a second time. The data collector 130 receives, retrieves, or aggregates the data set 170 periodically (e.g., every minute, every week) responsive to a change or modification of the data set 170 by the source (e.g., the payroll processing system or the utility service provider 120), from a push or request from the source to collect the data set 170, by a request (e.g., as implemented by a client device 125), or by a push or a query from a subcomponent of the data processing system 105 (e.g., by the model trainer 190 instructing the data collector 130 to retrieve the data set 170). In some aspects, the data set 170 is associated with a time stamp. In some aspects, the data collector 130 receives the data as a data stream or real-time data feed. In some aspects, the data collector 130 pings or polls a source for the data set 170. In some aspects, the data collector 130 stores the data set 170 in the data repository 115. In some aspects, the data collector accesses and modifies the data repository 115 to store or alter the various data sets 170 collected.

Due to the large amount of data that can be collected, the data processing system 105 can use predictive analytics models (e.g., models 175) to improve the performance of data collecting or downstream processing by filtering out irrelevant data, or otherwise focusing the system on useful data. In an illustrative example, the data processing system 105 can employ predictive analytics models trained on historical compensation data to forecast the quality of incoming data elements. These models can predict the accuracy and reliability of employee compensation information, such as salaries, benefits, and payroll deductions, based on past patterns and anomalies. The data processing system 105 can prioritize data with higher predicted quality scores for compensation planning to ensure accurate and fair remuneration practices. By using predictive analytics, the data processing system 105 can prioritize high-quality compensation data elements, so that decisions related to carbon-neutral compensation are based on reliable information. This enhances the effectiveness of sustainability initiatives by accurately aligning compensation with environmental goals.

The data processing system 105 can use natural language processing for environmental data quality. For example, the data processing system can apply natural language processing (NLP) techniques to analyze textual data related to environmental and sustainability initiatives, such as carbon emissions reports, sustainability goals, and carbon offset projects. NLP algorithms can extract key insights and sentiment from unstructured data sources, facilitating prioritization of data elements that align with the organization's sustainability objectives. By leveraging NLP, the data processing system can prioritize environmental data elements used for carbon-neutral compensation planning. This includes prioritizing data on carbon emissions, sustainability goals, and carbon offset initiatives, so that compensation strategies support environmental sustainability.

The data processing system 105 can provide reinforcement learning for adaptive prioritization. The data processing system can implement reinforcement learning algorithms to dynamically adjust the prioritization of data elements based on feedback and outcomes. The data processing system 105 can learn from past decisions and their impact on compensation planning, continuously refining prioritization strategies to focus on data elements that contribute most to achieving sustainability targets.

With reinforcement learning, the data processing system 105 can adaptively prioritize data elements essential for sustainable compensation practices. This allows the data processing system 105 to remains responsive to changing environmental goals and evolving organizational priorities, thereby improving the effectiveness of the data processing system 105 in promoting carbon neutrality through compensation planning.

Figure 4:
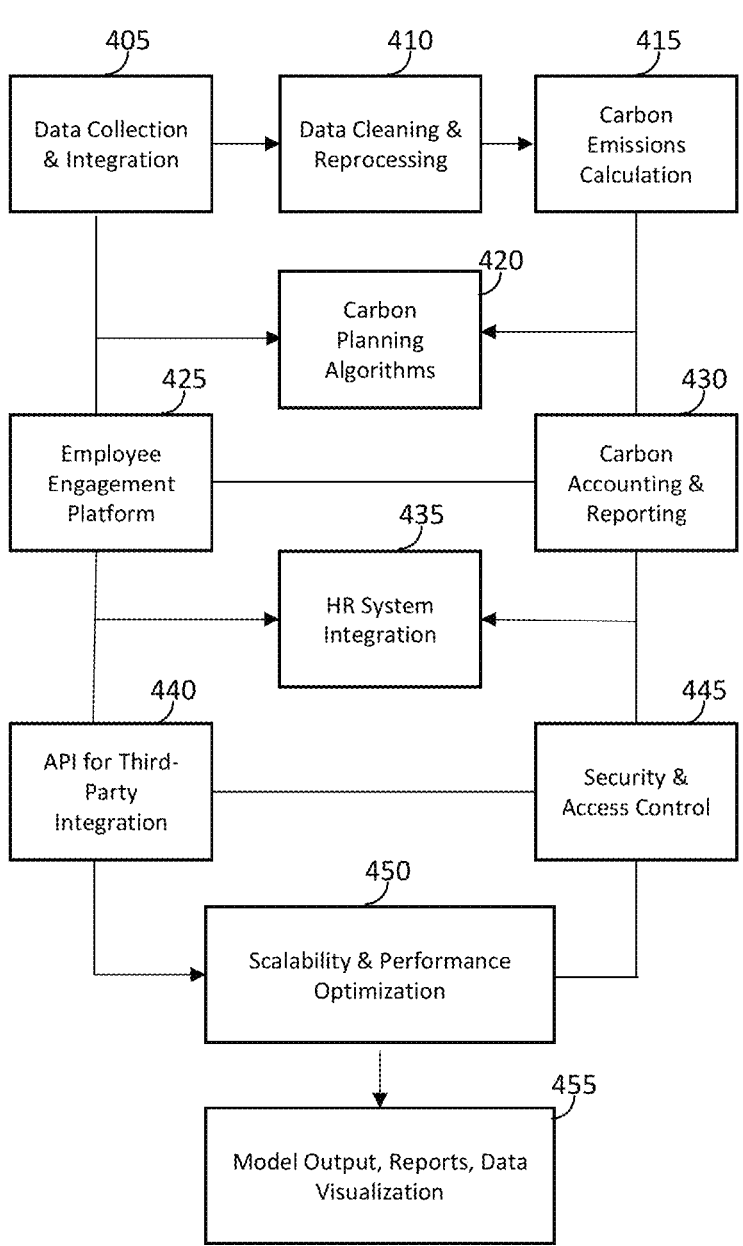
FIG. 4 depicts an example method for synchronizing data sets that can be used to reduce carbon emissions using machine learning, in accordance with some implementations.

The data collector 130 synchronizes one or more subcomponents of the data set 170 (e.g., the payroll elements 160, the utility service elements 165, the third party elements 195, or the profiles 185). The data collector 130 can synchronize the data set 170 through API integration, Extract, Transform Load (ETL) Processes, or data replication and sync tools. The data collector 130 can utilize one or more models 175 to synchronize the data set 170, or one or more subcomponents of the data set 170, for example as depicted in FIG. 4. The data collector 130 can perform pre-processing or data cleaning techniques to modify, clean, or otherwise prepare the data to improve the performance of other components of the data processing system 105 that utilize the data.

For example, the data processing system 105 can analyze, using the one or more models, the data indicative of energy consumption associated with the one or more locations of the entity or the data from the utility service provider system to determine an inconsistency within the data indicative of energy consumption associated with the one or more locations of the entity or the data from the utility service provider system. The inconsistency can correspond to an error, missing data value, or an outlier value that falls outside a nominal range. The data processing system 105 can remove the inconsistency from the data indicative of energy consumption associated with the one or more locations of the entity or the data from the utility service provider system to cleanse the data indicative of energy consumption associated with the one or more locations of the entity or the data from the utility service provider system.

The data processing system 105 can be configured with various data validation techniques. For example, the data processing system 105 collects data from various sources about carbon emissions, such as energy usage, transportation, and waste production. The data processing system 105 can perform data validation so that each data point conforms to predefined standards. For instance, energy usage data can be in kilowatt-hours (kWh), transportation data includes emissions in metric tons of CO2 equivalent, and waste production data is measured in kilograms. The data processing system 105, by implementing data validation rules, can collect or accept accurate and standardized data related to carbon emissions. This allows the data processing system 105 to maintain data integrity and consistency, which allows for accurately calculating carbon footprints and generating actions.

The data processing system 105 can perform data cleansing and standardization. In the collected data, there may be inconsistencies such as misspelled company names, variations in measurement units (e.g., pounds vs. kilograms), or duplicates of the same data points. The data processing system 105 can apply data cleansing techniques to correct these issues, thereby standardizing the data and removing errors.

By cleansing and standardizing the data, the data processing system 105 can calculate carbon emissions and generate associated actions based on accurate and consistent information, thereby improving the reliability of the output of the data processing system 105.

The data processing system 105 can perform anomaly detection. The data processing system 105 can use anomaly detection techniques to identify unusual spikes or drops in carbon emissions data that may indicate errors or significant changes in behavior. The data processing system 105 can use machine learning models 175 trained on historical data to automatically flag such anomalies for further investigation. Detecting anomalies in carbon emissions data allows the data processing system 105 to maintain data quality and reliability. By promptly identifying and addressing potential errors or irregularities, the data processing system 105 can generate and execute actions that accurately reflect actual carbon footprints.

The data processing system 105 can include a correlation identifier 135 designed, constructed, and operational to determine one or more relationships within the data set 170. The correlation identifier 135 can include any combination of hardware and software to determine one or more relationships among the data set 170. The correlation identifier 135 can receive the data set 170 from the data collector 130 or the data repository 115. The correlation identifier 135 can receive the data from the data collector 130 or the data repository 115 after the data has been synchronized. The correlation identifier 135 can filter, curate, or scrub the data set 170. The correlation identifier 135 can provide enhanced data privacy and security. The correlation identifier 135 can remove, delete, or modify duplicate values or arrangements of the data set 170. Thus, the correlation identifier 135 can improve the performance of components of the data processing system 105 that use the data by improving the quality of the data, thereby improving the reliability, accuracy or efficiency with which carbon emission metrics are computed and actions can be generated to reduce such carbon emissions.

The correlation identifier 135 can use one or more models 175 to determine relationships within the data set 170. The models 175 can include models trained with machine learning using training. For example, the correlation identifier 135 can determine, based at least on the payroll elements 160 (e.g., data received from the payroll processing system 110) and the utility service elements 165 (e.g., data received from the utility service provider 120) a first value of a metric indicative of carbon emissions (e.g., a carbon footprint) associated with the one or more locations of the entity 112. From the carbon footprint, the correlation identifier 135 can determine a second value of a metric of carbon emissions (e.g., a second carbon footprint) of one or more profiles 185 associated with the entity 112. In this manner, the correlation identifier 135 determines carbon footprints for one or more organizational subunits of the entity 112.

For example, the correlation identifier 135 can determine a carbon footprint for an entity 112 at a global level (e.g., a cumulative carbon footprint for the one or more locations of the entity 112). The correlation identifier 135 can determine a carbon footprint for any number of the locations of the entity 112 less than the total number of locations of the entity 112. The correlation identifier 135 can determine a carbon footprint for an organizational subunit of the entity (e.g., the carbon footprint for the marketing team across all locations of the entity 112). The correlation identifier 135 can determine a carbon footprint for an organizational subunit of the entity 112 for any number of the locations of the entity 112 less than the total number of locations of the entity 112 (e.g., the carbon footprint for the marketing team at one, two, three, or X-1 locations of an entity 112, where X represents the total number of locations of the entity 112, or the carbon footprint for a specific project team, or a subset of the project team of a research & development department of the entity 112). The correlation identifier 135 can determine a carbon footprint for an employee of the entity 112 (e.g., the CEO of a corporation, the vice-president of the corporation, a project manager of the corporation, or a lower level employee of the corporation). In this manner, the correlation identifier 135 provides a high level of granularity when determining the first value of the metric indicative of carbon emissions associated with the one or more locations of the entity 112.

The data collector 130 and correlation identifier 135 can address the technical challenge of determining a metric indicating of a carbon footprint for one or more locations of an entity 112. The data collector 130 aggregates and synchronizes the data set 170 from one or more subcomponents (e.g., the payroll elements 160, the utility service elements 165, the third party elements 195, or the profiles 185, among others) from one or more sources (e.g., the payroll processing system 110 or the utility service provider 120). For example, for the wide range of types of data present in the payroll elements 160 component of the data set (e.g., salary, wages, bonuses, overtime pay, commissions, benefits and perks, payroll deductions, variable pay, payroll frequency, employee compensation, payroll expenses, employee demographics, compensation structure, benefit analysis, or turnover metrics, among others as discussed above), the data collector 130 can allow for the correlation identifier 135 to quantify the carbon footprint of the one or more locations of the entity 112 with a high level of granularity. Upon the data collector 130 including utility service elements 165 or third party elements in the aggregation and synchronization of the data set 170, the data collector 130 can allow the correlation identifier to determine the first value of the metric associated with carbon emissions at an even higher level of granularity by accounting for how factors such as geographic location, solar radiation, commuting distance, vehicle types, business travel records, waste production, etc., affect the carbon emissions of the one or more locations of the entity 112. For example, the data processing system 105 can process data or perform a computation to determine the metric. The data processing system 105 can obtain data indicative of carbon emissions associated with performing certain activities at a location, such as commuting distance and a vehicle type, and calculate the amount of carbon emissions associated with the commutes of employees at the location. The data processing system 105 can compute, calculate, or use a machine learning model to determine the first value of the metric, which can be based on the commutes of employees at the location. The data processing system 105 can take into account various other activities at the location to determine a value of the metric indicative of carbon emissions (e.g., compute carbon emissions based on number of airline miles associated with a location of an entity, waste production at the entity, energy consumption at the entity, etc.).

By aggregating and synchronizing the various components of the data set 170 (e.g., the payroll elements 160, the utility service elements 165, the third party elements 195, or the profiles 185) the data collector 130 allows the correlation identifier 135 to quantify the carbon footprint of the one or more locations of the entity 112 at a high level of granularity (e.g., all the way down to different job roles). This data collector 130 can provide improved granularity by using the variety of different types and aggregating and synchronizes the different types of data within the data set 170.

The data processing system 105 can include a threshold evaluator 140 designed, constructed, and operational to implement an automated process to identify, generate or update a threshold value, or compare values of metrics with a threshold. The threshold evaluator 140 can reduce the first value of the metric associated with carbon emissions for the one or more locations of the entity 112. The threshold evaluator 140 can include any combination of hardware or software for reducing carbon emissions for an entity 112.

The threshold evaluator 140 compares the first value of the metric determined by the correlation identifier 135 with a threshold. The threshold can be an amount of carbon emissions (or other greenhouse gas emissions) for the one or more locations of the entity. The threshold evaluator 140 can determine the threshold according to a benchmark for an industry of the entity 112. The threshold evaluator 140 can determine the threshold according to best practices for carbon reduction determined through factors such as academic research.

In some cases, the threshold evaluator 140 can determine the threshold using a model 175. In some cases, the threshold evaluator 140 can determine an industry of the entity 112. The threshold evaluator 140 can provide one or more components of the data set 170 as an input to the model 175. The model 175, responsive to the input, can output or provide the industry of the entity 112. In some implementations, the model 175 can determine the threshold using natural language processing of one or more benchmarks of the industry of the entity 112. For example, the threshold evaluator 140 can parse, process or otherwise analyze electronic documents to determine benchmarks for an industry or a geographic location associated with the entity. The threshold for carbon emissions can be customized or determined based on constraints, rules, or regulations established for a geographic area, such as a city, state, region, or country. In this manner, the threshold evaluator 140 can generate a threshold that is tailored to the industry or geographic location of the entity 112. The threshold evaluator 140 can provide additional granularity to the threshold by taking into account third party elements 195. By taking into account factors such as population density, rural vs urban classification, solar radiation, and weather patterns, among others, the threshold evaluator 140 can determine a threshold that accounts for how various location-based data attributes such as third party elements can affect the carbon footprint of the one or more locations of the entity 112. In some embodiments, the threshold can be determined by a client device associated with the entity 112.

Thus, the threshold evaluator 140 can use one more models 175 to identify the industry of the entity and one or more benchmarks for the industry. The models 175 can include a natural language processing model that can parse or analyze data associated with carbon emissions or other greenhouse gas emissions for an industry. The benchmark can correspond to a statistical metric associated with emissions. For example, the benchmark can be an average, median, minimum, maximum, or range. The benchmark can be for a geographic region. The benchmark can be for a time interval, such as a year, season, quarter, month, or week. The threshold can be set or established based on a statistical metric for an industry in a geographic region during a time interval. For example, the threshold can be based on an offset (e.g., percentage, numerical value, standard deviation) applied to the average carbon emissions for an industry located in a particular geographic region during a month.

The data processing system 105 can generate additional benchmarks, such as a second benchmark for a location of the entity. The second benchmark can be generated for a different time interval relative to the first benchmark, such as the next month or season. The second benchmark can be generated using different techniques. For example, the first benchmark can correspond to a default value, whereas the second benchmark can be generated using natural language processing and based on current or updated documents. To generate the second benchmark, the threshold evaluator 140 can, for example, crawl websites to parse electronic documents related to metrics for carbon emissions.

Upon a determination by the threshold evaluator that the first value indicative of carbon emissions for the one or more locations of the entity 112 does not satisfy a threshold (e.g., is greater than or above the threshold, the carbon footprint for the one or more locations of the entity is greater than the industry benchmark, or that the carbon footprint for the one or more locations of the entity 112 are otherwise greater than desired), the threshold evaluator 140 can determine to execute an automated process to reduce the metric. The data processing system 105 can execute the automated process using or via the payroll processing system 110. The automated process can generate one or more actions 180 to execute that are configured to reduce the metric.

The data processing system 105 can include an emissions controller 145 designed, constructed and operational to identify, generate, update or otherwise provide an action that is configured to manage, control, or reduce carbon emissions associated with an entity. The emissions controller 145 can use one or more models trained with machine learning to generate the action. The models can be trained by the model trainer 190 using historical data received from the payroll processing system 110 and historical data received from the utility service provider system 120. The action provided by the emissions controller 145 can be executed via an automated process that is configured to reduce the first value of the metric generated and triggered by one or more component of the data processing system 105 (e.g., correlation identifier 135 or threshold evaluator 140).

The emissions controller 145 can select an action from the actions 180 data structure stored in data repository 115. Example actions 180 can include: i) adjust power consumption by computing devices at a location of the entity; ii) adjust load balancing parameters by servers; iii) an adjustment to a profile of an employee or group of employees; iv) adjust electronic device performance management; v) adjust electronic notification management; vi) adjust vehicular routes computed by a navigation system; or vii) adjust compensation planning functions. Actions 180 can include, for example, setting sustainability targets related to compensation practices, such as reducing the carbon footprint associated with total compensation. Actions 180 can include providing or developing carbon-neutral strategies to align with compensation practices with carbon neutrality, such as promoting remote work, reducing business travel, or incentivizing eco-friendly benefits. Actions 180 can include providing sustainable compensation incentives, such as creating compensation structures that reward employees for environmentally responsible actions (e.g., using public transportation, reducing energy consumption, or participating in sustainability programs). Actions 180 can include sustainability reporting, including implement mechanisms for reporting and monitoring progress toward sustainability goals within the compensation planning process. In some cases, actions 180 can include employee engagement assessment, such as assessing employee engagement with sustainability initiatives, including willingness to participate in carbon-neutral practices and sustainability education programs. Actions 180 can include employee training and education, such as offering training and educational resources to increase understanding of the importance of carbon neutrality, sustainability, and roles in achieving these goals.

The models 175 used by the emissions controller 145 to select or generate an action to reduce carbon emissions can be trained on data that includes the impact executing the actions 180 has on reducing carbon emissions. The models 175 can be trained on historical payroll data and utility grid data to predict how an action from the actions 180 data structure can impact carbon emissions. Using the models 175, the emissions controller 145 can predict, identify, select, or otherwise generate an action that is configured to reduce carbon emissions. The emissions controller 145 can select an action to reduce carbon emissions to satisfy the threshold. For example, the emissions controller 145 may select an action to satisfy the threshold, as opposed to select an action to minimize carbon emissions, as an action to satisfy the threshold may facilitate optimizing operations of the entity, while minimizing the carbon emissions may result in negatively impacting operations at the entity beyond a desired amount.

In an illustrative example, the emissions controller 145 can select an action to adjust a public transportation benefit. The action can be to increase funds provided to use public transportation by a group of employees at a location of the entity. In some cases, increasing funds for public transportation can reduce carbon emissions associated with an entity as a result of fewer commuters driving vehicles that burn fossil fuels. However, in some cases, the emissions controller 145 can determine that incentivizing carpooling may result in a greater reduction in fossil fuels for circumstances in which public transportation is not accessible to a group of employees.

The data processing system can generate various types of an action. For example, an action can include setting a sustainability target related to compensation practices, such as reducing the carbon footprint associated with total compensation. An action can include aligning a compensation practice with carbon neutrality, such as promoting remote work, reducing business travel, or incentivizing eco-friendly benefits. An action can include compensation structures that reward employees for environmentally responsible actions, such as an action to incentivize or reward using public transportation, reducing energy consumption, or participating in sustainability programs. An action can include an employee engagement survey, employee training or education.

To generate the action, the data processing system can use a generative machine learning model that can use the received data to generate compensation packages that align with sustainability goals, reduce carbon emissions, or create a responsible approach to compensation planning that benefits both employees and the environment. The data processing system can use the model to generate compensation scenarios that balance employee needs and preferences with the organization's carbon-neutral objectives.

The data processing system 105 can include a profile selector 150 designed, constructed and operational to identify, select, or otherwise a determine one or more profiles for which to apply the action generated by the emissions controller 145. The profile selector 150 can use one or more models 175 to select a first profile from a set of profiles. The profile selector 150 can select or determine the profile that is compatible with the generated action. For example, profiles can correspond to employees at a location of the entity 112. If the action is to increase an incentive to use public transportation in order to reduce carbon emissions associated with the location of the entity, then the profile selector 150 can select a compatible profile as a profile that corresponds to an employee that has a start location and destination within a threshold distance of public transportation. In another example, if the generated action is to reduce power consumption of a computing device at the location, then the profile selector 150 can select a power management profile of a computing device that, based on historical processing utilization, is not utilized to perform computations during certain time intervals and can select an action to put the computing device in a standby, sleep, or other low-power mode during such time intervals.

To select the profile that is compatible with the action, the profile selector 150 can apply a filter or perform a search using criteria. The profile selector 150 can filter profiles 185 based on attributes of the generated action. For example, the generated action can include an entity attribute, location attribute, type attribute, employee role attribute, temporal attribute, device type attribute, transportation mode attribute, benefits attributes, or any other attribute based on the available data. If the action is to decrease an amount of a type of benefit, for example, then the profile selector 150 can identify profiles that currently receive an amount of the type of benefit. If the action is to increase an amount of a type of benefit, for example, then the profile selector 150 can identify profiles that are eligible for the type of benefit.

Upon identifying one or more profiles that are compatible with the action, the profile selector 150 can command the payroll processing system 110 to execute the generated action for the selected first profile to cause a reduction in the first value of the metric. In some cases, the profile selector 150 can automatically command the payroll processing system via an automated process to execute the action. In some cases, the profile selector 150 can generate a prompt for display in an element of a graphical user interface. The data processing system 105 can receive, responsive to an interaction with the prompt, an instruction or command to execute the action. In some cases, the data processing system 105 can transmit a notification and initiate a countdown timer, such that if the action is not blocked or rejected within a time interval, then the data processing system 105 can automatically execute the action.

The profile selector 150 can use one or more of the models 175 to select the profile for the action. For example, the one or more models 175 can be trained on historical compatibility or performance of types of actions on profiles having certain attributes. The model 175 can receive, as input, information about the generated action (e.g., the type of action, attributes associated with the action, location or entity at which to perform the action), and profiles 185 associated with the entity 112 or location at which to perform the action. To reduce computing resource utilization associated with the inference stage of a machine learning model, the profile selector 150 can pre-process or filter the set of profiles 185 based on one or more criteria. For example, the profile selector 150 can filter out or remove profiles that are not compatible with the generated action based on a location attribute. The profile selector 150 can input the information about the generated action and the filtered set of profiles 188 to generate an output that includes a prediction or identification of one or more profiles.

The profile selector 150 can select some or all of the profiles output by the model 175. In some cases, the model 175 can output a confidence score along with the profile. The confidence score can indicate a level of confidence that performing the action on the profile results in a reduction of carbon emissions. The profile selector 150 can compare the confidence scores with a threshold (e.g., 50%, 60%, 70%, 80% or other threshold), and select the profiles that satisfy the threshold. In some cases, the profile selector 150 can rank the profiles based on the confidence score, and select a predetermined number of the top ranking profiles (e.g., top 3 profiles, top 5 profiles, top 10 profiles, or more) or a percentage of top ranking profile (e.g., top 5%, 10%, 15%, 20%, 30%, 50%, or other percentage).

In an illustrative example, the data processing system 105 can determine, via the automated process, a benefit correlated to the selected first profile. The data processing system 105 can command, via the automated process, responsive to performance of the action, the payroll processing system to execute a second action associated with the benefit. For example, upon completion of the initial action on the selected one or more profiles, the data processing system 105 can execute a second action to assign a benefit that can further incentivize completion of the first action. The data processing system 105 can correlate a second benefit to the initial benefit associated with the initial action that can further reduce carbon emissions. For example, if the first benefit corresponds to incentivizing public transportation, then the second benefit can correspond to incentivizing remote work on days or times during which there may be heavy traffic (e.g., greater than average traffic).

The data processing system 105 can include an emissions monitor 155 designed, constructed and operational to monitor, measure, or otherwise determine carbon emissions of the entity. The emissions monitor 155 can receive a data stream from one or more sensors that can measure or detect information related to carbon emissions. The emissions monitor 155 can interface with one or more sensors or other data sources via an application programming interface. For example, the emissions monitor 155 can access a data repository or resource via network 101 that can provide data associated with carbon emissions for an entity.

The emission monitor 155 can generate a graphical user interface on which to display information. The emissions monitor 155 can generate various dashboards for presentation or rendering via a graphical user interface by a client device 125. The emissions monitor 155 can generate an interactive graphical user interface that can include various graphical user interface elements that can be configured to control aspects of the data processing system 105. For example, the emissions monitor 155 can display the impact to a value of the metric based on execution of a generated action. To determine the impact, the emissions monitor 155 can obtain second data indicative of energy consumption associated with a location of the entity subsequent to execution of the action, generate a second value of the metric based on the second data, and then determine the impact the executed action had on the value of the metric. The impact can include, for example, an amount of change in the value (e.g., percentage or absolute amount of increase or decrease, a binary indicator, a score, or grade).

Thus, the emissions monitor 155 can facilitate determining the impact an action generated and applied via the emissions controller 145 or profile selector 150 has on reducing, maintaining, or otherwise controlling or managing the emissions associated with an entity. For example, the emissions monitor 155 can determine the carbon emissions prior to the action generated by the emissions controller 145, and the emissions subsequent to execution of the action. The emissions monitor 155 can provide the information to one or more system or component of the data processing system 105, including, for example, the data collector 130, the correlation identifier 135, or the threshold evaluator 140.

In some cases, the emissions controller 145 can provide multiple options for actions for display via an interactive graphical user interface, and receive a selection of an action that can be executed to control emissions. For example, the emissions controller 145 can generate, using the one or more models, multiple actions that are configured to reduce the first value of the metric. The data processing system 105 can determine, using the one or more models, an impact to the first value of the metric for each of the plurality of actions. The emission monitor 155 can display, via the graphical user interface, the multiple actions as a plurality of graphical user elements. The graphical user elements can correspond to one of the multiple actions. The emissions controller 145 can arrange, via the graphical user interface, the graphical user elements according to the impact to the first value of the metric determined for each of the plurality of actions. The data processing system 105 can receive, via the graphical user interface, a selection of one of the plurality of graphical user elements.

In some cases, the emissions monitor 155 can include one or more component or functionality of the data collector 130. The emissions monitor 155 can interface or otherwise communicate with the data collector 130 to monitor emissions. For example, the emissions monitor 155 can establish a schedule or conditions at which to obtain data associated with emissions for an entity, and instruct, command, or otherwise cause the data collector 130 to retrieve, request, fetch, or otherwise obtain the information. The emissions monitor 155 can receive the data from the data collector 130, or data repository 115, and compare the emissions data with previously collected data to determine whether an action executed by the data processing system 105 to control emissions had the desired impact.

The data processing system 105 (e.g., via the emissions monitor 155) can determine an impact on the first value of the metric associated with the one or more locations of the entity caused by an application of the generated action to the one or more locations of the entity. The emission monitor 155 can use one or more models 175 trained via the model trainer 190 to determine the impact. For example, the emission monitor 155 can generate an input based on the collected data, and provide the input to a model 175 in order to output an impact the action had on the emissions. Based on the impact, the emission monitor 155 (or other component of the data processing system 105) can determine whether to generate a second action.

For example, the data processing system 105 can determine to generate a second action to further reduce or otherwise control the emissions at one or more locations of the entity. To do so, the data processing system can receive, from the payroll processing system, second data for each of the plurality of profiles linked with the one or more locations of the entity. The second data received from the payroll processing system can indicate energy consumption associated with the one or more locations of the entity subsequent to completion of the action. The data processing system 105 can also obtain second data from the utility service provider system 120. The second data from the utility service provider system 120 can indicate metrics associated with energy consumption or carbon emissions as measured, determined, or otherwise identified by the utility service provider 120. The second data received from the payroll processing system 110 and the second data received from the utility service provider system 120 can correspond to a time interval subsequent to execution of the first generated action.

The data processing system 105 can determine a second value of the metric based at least in part on the second data from the utility service provider system 120 and the second data indicative of energy consumption associated with the one or more locations of the entity. The data processing system 105 can determine the second value of the metric in a similar manner as the first value of the metric is generated, including, for example, the correlation identifier 135.

The data processing system 105 can compare, using the one or more models 175, the second value of the metric with the threshold. Based on the comparison, the data processing system 105 can generate, using the one or more models, a new action to execute via the automated process subsequent to a determination that the second value of the metric is greater than the threshold. For example, the data processing system 105 can determine that while the first action may have reduced the value of the metric, that the value of the metric may still be above the threshold and the performance of one or more component of the system 100 can be further improved by further reducing the value of the metric to satisfy the threshold.

To do so, the data processing system 105 can select, using the one or more models 175, a second profile from the plurality of profiles that is compatible with the generated new action. The second profile can be a different profile relative to the first profile. For example, the second profile can correspond to a different device or component relative to the first profile, or a different type of device or component relative to the first profile. The second profile can correspond to a different employee relative to the employee of the entity associated with the first profile, for example. The data processing system 105 can command, via the automated process, the payroll processing system to execute the generated second action to the selected second profile to cause a second reduction in the second value of the metric.

In some cases, the data processing system 105 can determine that while the second value of the metric is less than the first value of the metric, that the data processing system 105 can generate a second action to apply to the same first profile to cause further reduction in the metric. The data processing system 105 can generate, based on a comparison of the second value of the metric with the threshold, the second action to cause a further reduction in the metric and execute the second action on the same first profile.

In another illustrative example, the data processing system can generate values for various types of metrics in order to generate actions to control carbon emissions. For example, the data processing system 105 can generate a value for a second metric that can be indicative of computing resource utilization at one or more locations of the entity. The computing resource utilization can refer to or include energy consumption associated with processors or memory of one or more servers, processor utilization, memory utilization, or network bandwidth utilization. The computing resource utilization can refer to processing load on a server (e.g., percentage of processor or server utilization). The computing resource utilization can refer to an inactive or idle state of processors.

The data processing system 105 can identify, based at least in part on the data indicative of energy consumption associated with the one or more locations of the entity and the data from the utility service provider system, a value of the second metric that is indicative of the computing resource utilization of the one or more locations of the entity. The data processing system 105 can generate, using the one or more models, a second action to execute via the automated process that is configured to reduce the second value of the second metric. For example, the data processing system 105 can determine to power off or cause a server or computing device to enter a standby or low power mode upon determining a server is underutilized or inactive or idle. The data processing system 105 can select, using the one or more models, a second profile from the plurality of profiles that is associated with the one or more locations of the entity. The second profile can correspond to a power management profile to apply to the server to reduce power consumption. The data processing system 105 can command, via the automated process, the payroll processing system to execute the generated second action for the selected second profile to cause a reduction in the second value of the second metric. For example, the data processing system 105 can apply a power consumption profile to the server that may be consuming excessive energy.

In some cases, the first profile can include multiple profiles. For example, the first profile can correspond to an entity 112 that includes multiple sub-profiles corresponding to employees of the entity 112. In some cases, the first profile can correspond to a category or profiles or group profiles, which can include or be linked with multiple sub-profiles. For example, the first profile can correspond to a type of computing device, while second profiles can correspond to identifiers of specific devices of the type of computing device. In another example, the first profile can correspond to a type of commuter (e.g., drives, public transportation, or walks), while second profiles can correspond to specific identifiers of employees.

The data processing system 105 can determine, upon identifying the second profile, that a different action can further reduce carbon emissions for the group of profiles, and then execute the second action. For example, the data processing system 105 can identify, using the one or more models, a second profile from the first profile, the first profile having a plurality of profiles. The data processing system 105 can determine, using the one or more models, a second value of the metric indicative of carbon emissions associated with the selected second profile. The data processing system 105 can generate, based on a second comparison of the second value of the metric and the generated action, a second action that is configured to reduce the second value of the metric. The data processing system 105 can execute the second generated action for the second profile. The data processing system 105 can command, via the automated process, the payroll processing system to replace the generated action with the second generated action to cause the reduction in the carbon emissions associated with the one or more locations of the entity linked with the selected first profile.

In some aspects, the models 175 (hereinafter referred to as model(s) 175, machine learning model(s) 175, trained model(s) 175, or retrained model(s) 175) include one or more neural networks, decision-making models, linear regression models, natural language models, random forests, classification models, reinforcement learning models, clustering models, neighbor models, decision trees, probabilistic models, classifier models, or other such models. For example, the models 175 include natural language processing (e.g., support vector machine (SVM), Bag of Words, Counter Vector, Word2Vec, k-nearest neighbors (KNN) classification, long short erm memory (LSTM)), object detection and image identification models (e.g., mask region-based convolutional neural network (R-CNN), CNN, single shot detector (SSD), deep learning CNN with Modified National Institute of Standards and Technology (MNIST), RNN based long short term memory (LSTM), Hidden Markov Models, You Only Look Once (YOLO), LayoutLM) (classification ad clustering models (e.g., random forest, XGBBoost, k-means clustering, DBScan, isolation forests, segmented regression, sum of subsets 0/1 Knapsack, Backtracking, Time series, transferable contextual bandit) or other models such as named entity recognition, term frequency-inverse document frequency (TF-IDF), stochastic gradient descent, Naïve Bayes Classifier, cosine similarity, multi-layer perceptron, sentence transformer, data parser, conditional random field model, Bidirectional Encoder Representations from Transformers (BERT), among others. It should be understood that this listing of machine learning models is exemplary and is not construed to be exhaustive or limiting.

In some aspects of the technical solutions described herein, modifying inputs to one or more of the models 175 can include efficient feature encoding. Efficient feature encoding refers to generating inputs for the model 175 using criteria or predictive analytics to prioritize certain features or types of data. Efficient feature encoding reduces time and computational power for the model 175 to process inputs to produce outputs.

The data processing system 105 includes a model trainer 190 designed, constructed, and operational to train, identify, or operate the models 175. The model trainer 190 trains the models 175 by receiving one or more of input from client devices 125, or the data set 170, among others. The model trainer 190 identifies models 175 for use by other subcomponents of the data processing system 105. The model trainer 190 stores or modifies the models 175 in the data repository 115.

To train the models 175, the model trainer 190 can use one or more of the data set 170, or one or more parameters correlated to the data set 170. The model trainer 190 uses the training data set constructed from data acquired from or associated with one or more client devices 125, payroll processing systems 110, or utility service providers 120. For example, the model trainer 190 trains the models 175 using data. In some embodiments, the model trainer 190 trains the models 175 using a training set constructed from data associated with the client device 125 during prior sessions. In this manner, the models 175 can be trained across a large data set by incorporating data associated with multiple data structures 170 or entities 112.

The model trainer 190 feeds, supplements, or provides the input training data set as inputs to the models 175 to train the models 175. The inputs are or include the inputs as described herein in addition to the input training data set. The model trainer 190 uses the input training data set to train models 175 based on known outputs of the input training data set. The input training data set can be annotated by a user of a client device 125 or otherwise have known outputs or incomes. By providing the input training data set with the inputs and known outputs to the models 175, the model trainer 190 generates the trained models 175. For example, the input training data set includes a large variety of data types, criteria, or parameters, among others. The input training data set can be marked to distinguish each attribute of the input training data set. The model trainer 190 generates the trained models 175 by providing the inputs to create the known outputs. This process can be iterative and can utilize any of the inputs or machine learning models described herein.

The model trainer 190 validates the trained models 175 using a test data set. With generation of the models 175, the model trainer 190 provides inputs based on the test data set to determine a validity of each of the models 175. The validity of each of the models 175 can relate to an error. The error is the difference between the known outcomes of the test data set and actual outcomes when inputs based on the test data set are provided to the models 175. For example, the test data set includes a known input and outcome. Upon providing the known input to a model 175 trained to accept that input, the model 175 provides the known outcome, or can provide a different, erroneous outcome. This comparison between the known outcome and the model-generated outcome can be repeated for various inputs of a model 175 to generate an overall error score or rate. The error score or rate relates to the validity of the model 175. If the error score or rate for the model 175 exceeds a threshold error, the model 175 is considered invalid or erroneous. If the error score or rate for the model 175 is at or below the threshold error, the model 175 is considered valid. In this manner, each model 175 is validated.

The model trainer 190 retrains the models 175. The model trainer 190 can retrain the models 175 responsive to the error score of one of the models 175 being above a threshold error. In some cases, the model trainer 190 determines the error score of the models 175 is above the threshold error (e.g., invalid) responsive to generation of the models 175 by the model trainer 190. For example, the model trainer 190 determines that a model 175 of the models is invalid based on an error score of the model 175 exceeding an error threshold for the model 175 upon generation. The model trainer 190 determines that the models 175 are invalid prior to storing the models 175 in the data repository 115. The model trainer 190 can check the models 175 periodically to determine validity of the models 175. For example, model 175 which was once valid can drift, or become less valid or have a higher error score over time. The model trainer 190 checks the validity of the models 175 stored in the data repository 115, the models 175 generated by the model trainer 190, or the models of the system 100.

Upon the model trainer 190 determining that one or more models 175 are invalid, (e.g., the error score is above the threshold error), the model trainer 190 instructs the data collector 130, correlation identifier 135, threshold evaluator 140, or emissions monitor 155 to aggregate, collect, retrieve, or generate a second training data set. With receipt of the second training data set, the model trainer 190 retrains the models 175. The model trainer 190 divides the second training data set into subsets, such as a second training input data and a second test data. The model trainer 190 combines the training data set and the second training data set. For example, the model trainer 190 incorporates, combines, or adds the second training data to the training data. With the aggregation of the second training data set, the model trainer 190 provides further inputs and known outcomes to further train the models 175. The model trainer 190 retrains the models 175 with an error score above the threshold error, all of the models 175, or selected models 175. The model trainer 190 can retrain the models 175 or a subset of the models 175 subsequent to the elapse of a period of time. For example, the model trainer 190 retrains a model 175 every week, every year, or upon its error score not satisfying (e.g., exceeding) the threshold error for the model 175.

The model trainer 190 checks the retrained models 175 for validity. The model trainer 190 checks or tests the retrained models 175, including, for example, by comparing an error score of each model 175 with a threshold error for each model 175. Upon the model trainer 190 determining that one or more of the retrained models 175 are invalid, the model trainer 190 aggregates a third training data set and repeats the retraining process. The retraining process can be repeated until the error score of the model 175 is below the threshold error. The model trainer 190 can issue an alert or notification if the model 175 fails testing or retraining a threshold number of times.

Upon the model trainer 190 determining that the retrained models 175 or the trained models 175 are valid, the model trainer 190 stores the models 175 in the data repository 115. In some cases, the model trainer 190 replaces a first model with a retrained model 175. The model trainer 190 replaces the first model with the retrained model 175 based on user input, or based on the first model having an error score above the threshold. In this manner, models 175 which have drifted, become erroneous, or no longer represent the data set 170 are replaced by the model trainer 190 to ensure the validity of the system 100.

The model trainer 190 generates or validates the models 175 in parallel, series, or combination thereof. For example, the model trainer 190 generates, validates, or stores a first model prior to the generation of a second model. In some aspects of the technical solutions described herein, a subsequent model uses as input an outcome of a prior model. In these aspects of the technical solutions described herein, the model trainer 190 generates, validates, or stores the subsequent model after the prior model.

Figure 2:
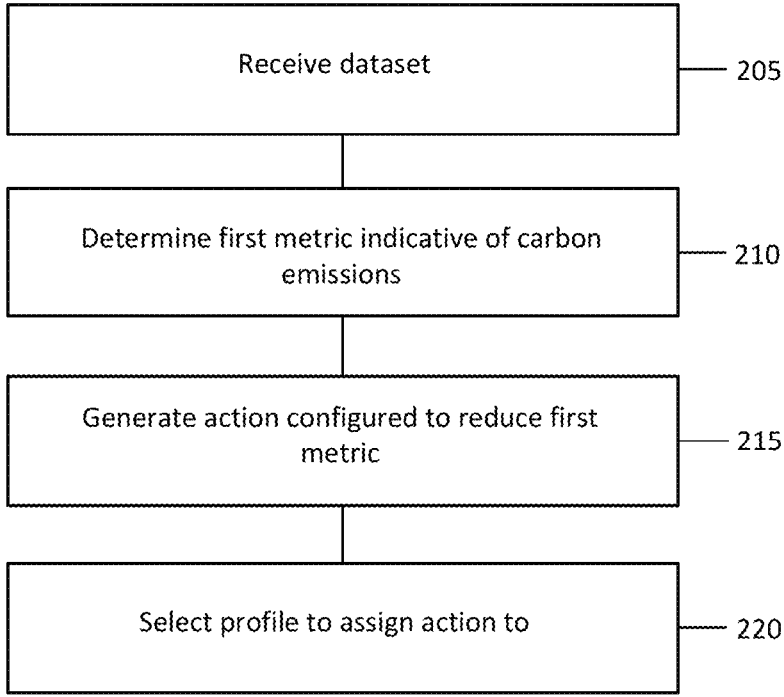
FIG. 2 depicts a method for reducing carbon emissions using machine learning, in accordance with some implementations.

FIG. 2 depicts a method 200 for reducing carbon emissions using machine learning, in accordance with some implementations. The method 200 can be performed by one or more system or component depicted in FIG. 1, FIG. 5, FIG. 6 or FIG. 7, including, for example, a data processing system. At ACT 205, the data processing system can receive a data set. The data processing system can receive the data from various systems or components, including, for example, a payroll processing system or a utility service provider. The data processing system can receive various types of data. The data processing system can receive the data at various time intervals. For example, the data processing system can receive a data stream, such as a real-time data feed. In some cases, the data processing system can receive data based on a time interval, periodically (e.g., ever 2 hours, 4 hours, 6 hours, 12 hours, 24 hours, or other time interval). In some cases, the data processing system can receive data responsive to a condition, event or trigger.

The data processing system can receive various types of data, including, for example, data for employees or data for employers (e.g., an entity). The data for employees can include one or more of: payroll data elements (e.g., salary, wages, bonuses, overtime pay, or commissions), benefits and perks (e.g., health insurance coverage, retirement contributions, stock options, or wellness program participation), payroll deductions (e.g., taxes (federal, state, local), social security contributions, Medicare contributions, or retirement plan contributions), variable pay (e.g., performance-based bonuses, profit-sharing distributions, or incentive compensation), payroll frequency (e.g., monthly, bi-weekly, or weekly), or demographic data (e.g., age, gender, marital status, family size, or educational level). The data for employers can include one or more of: employee compensation (e.g., total payroll expenses, salary distributions, bonus allocations, or benefits contributions), payroll expenses (e.g., payroll taxes, social security contributions, or Medicare contributions), employee demographics (e.g., workforce composition by age, gender distribution, or educational background), compensation structure (e.g., compensation by job role, pay equity analysis, or variable pay distribution), benefits analysis (e.g., cost of employee benefits, utilization rates for health insurance, retirement plan participation), or turnover metrics (e.g., employee retention rates, reasons for turnover, or cost of employee turnover).

The data processing system can receive data from carbon tracking data sources for the employee or employer, including, for example, energy consumption (e.g., utility bills, energy monitoring systems, or smart meters), transportation (e.g., commuting distance, vehicle types, or business travel records), supply chain (e.g., procurement records, supplier emissions data, or product lifecycle assessments), waste production (e.g., waste disposal records, recycling rates, or waste audits), environmental goals (e.g., company sustainability reports, carbon reduction targets, or renewable energy usage targets), or carbon offset initiatives (e.g., carbon offset purchases, renewable energy investments, or reforestation projects).

The data processing system can receive data from $3^{rd}$ party data elements for employees or employers, including, for example, environmental databases (e.g., Environmental Protection Agency databases, carbon footprint calculators, environmental impact assessments), industry benchmarks (e.g., average carbon emissions by industry, best practices for carbon reduction), weather data (e.g., temperature, precipitation, wind speed, solar radiation), geographic information (e.g., location-based emissions factors, population density, urban vs. rural classification, satellite Data to measure cars in corporate parking logs, or cell phone data to track commutes), market data (e.g., carbon credit prices, renewable energy market trends, sustainability investment indices), employee wellness programs (e.g., participation rates, health and fitness data, employee feedback and satisfaction scores), or academic research (e.g., studies on sustainable practices, behavioral economics research, or employee engagement studies).

At ACT 210, the data processing system can determine a first metric indicative of carbon emissions. To determine the first metric, the data processing system can process data or perform a computation that can include identifying activities performed at the entity and determining the amount of carbon emissions associated with the activity at the location. For example, the activity can be employee commutes, and the carbon emissions can be based on the type of vehicle (e.g., electric versus gas-powered vehicle). In some cases, the data processing system can identify the carbon emissions by receiving the information from a utility service provider or other remote server or computer. In some cases, the data processing system can identify the carbon emissions responsive to input from a client device.

The data processing system can use the received data to determine a first value of a metric indicative of carbon emissions associated with the one or more locations of the entity. The data processing system can compare the first value of the metric with a threshold to determine to execute an automated process via the payroll processing system to reduce the metrics. The automated process can refer to or include generated and executing an action on a profile.

For example, at ACT 215, the data processing system can generate an action configured to reduce the first metric. The data processing system can generate various types of an action. For example, an action can include setting a sustainability target related to compensation practices, such as reducing the carbon footprint associated with total compensation. Total compensation can refer to or include the salary of the employee plus any benefits, such as health insurance subsidy, retirement account benefits, travel voucher, public transportation subsidy, stock options, or relocation reimbursement. An action can include aligning a compensation practice with carbon neutrality, such as promoting remote work, reducing business travel, or incentivizing eco-friendly benefits. An action can include compensation structures that reward employees for environmentally responsible actions, such as an action to incentivize or reward using public transportation, reducing energy consumption, or participating in sustainability programs. An action can include an employee engagement survey, employee training or education.

To generate the action, the data processing system can use a generative machine learning model that can use the received data to generate compensation packages that align with sustainability goals, reduce carbon emissions, or create a responsible approach to compensation planning that benefits both employees and the environment. The data processing system can use the model to generate compensation scenarios that balance employee needs and preferences with the organization's carbon-neutral objectives.

The data processing system can generate actions for employees such as eco-friendly transportation subsidies (e.g., offer financial incentives or subsidies for employees who use eco-friendly modes of transportation, such as public transit, carpooling, cycling, or electric vehicles, to commute to work), remote work flexibility (e.g., provide opportunities for remote work or telecommuting to reduce the need for daily commuting and minimize carbon emissions associated with transportation), green commuting rewards (e.g., implement a rewards program that recognizes employees who adopt green commuting practices, such as offering gift cards, bonus points, or additional vacation days for using sustainable transportation options, carbon offsetting bonuses (e.g., offer bonuses or rewards to employees who actively participate in carbon offsetting initiatives, such as planting trees, supporting renewable energy projects, or purchasing carbon credits to compensate for their carbon footprint), energy-efficient equipment rebates (e.g., provide rebates or subsidies for employees who invest in energy-efficient appliances, electronics, or home improvements to reduce their energy consumption and carbon emissions at home), sustainability training and education (e.g., offer training sessions, workshops, or educational resources on sustainability topics to raise awareness among employees and empower them to adopt eco-friendly behaviors both at work and in their personal lives), green lifestyle discounts (e.g., partner with eco-friendly businesses to offer discounts or special deals on sustainable products, organic foods, energy-efficient appliances, and eco-friendly services to employees who demonstrate commitment to reducing their carbon footprint), community volunteer opportunities (e.g., organize community service projects or volunteer opportunities focused on environmental conservation, clean energy initiatives, or local sustainability efforts, allowing employees to contribute positively to the environment while earning recognition and rewards), carbon reduction challenges (e.g., launch carbon reduction challenges or competitions among employees, encouraging them to set personal goals for reducing their carbon emissions and offering incentives or rewards for achieving milestones or exceeding targets), or sustainable workplace initiatives (e.g., implement green workplace policies, such as recycling programs, energy-saving measures, waste reduction initiatives, and eco-friendly office practices, and recognize employees who actively participate in these efforts with incentives, rewards, or recognition programs).

The data processing system can generate actions or indicate incentives for employers to cut carbon emissions, such as tax benefits (e.g., companies receive tax incentives or credits for implementing carbon reduction programs and initiatives, providing financial benefits for investing in sustainable practices), cost savings (e.g., by reducing energy consumption, transportation expenses, and waste generation, companies can lower operational costs and improve profitability, offering a direct financial incentive for implementing carbon reduction strategies), brand reputation (e.g., demonstrating a commitment to sustainability and environmental responsibility can enhance the company's brand reputation, attracting eco-conscious customers, investors, and top talent, which ultimately contributes to long-term business success), regulatory compliance (e.g., adhering to environmental regulations and meeting carbon emission targets can mitigate the risk of fines, penalties, or legal liabilities, providing a strong incentive for companies to adopt carbon reduction measures).

At ACT 220, the data processing system can select a profile to which to assign the action, and then command, via the automated process, the payroll processing system to execute the generated action to the selected first profile to cause a reduction in the carbon emissions associated with the one or more locations of the entity linked with the selected first profile. In some cases, the data processing system can first generate the action that reduces carbon emissions, and then select a profile that is compatible or capable of performing the action. In some cases, the data processing system can identify a profile first, and then determine an action to perform on that profile to reduce carbon emissions.

Figure 3:
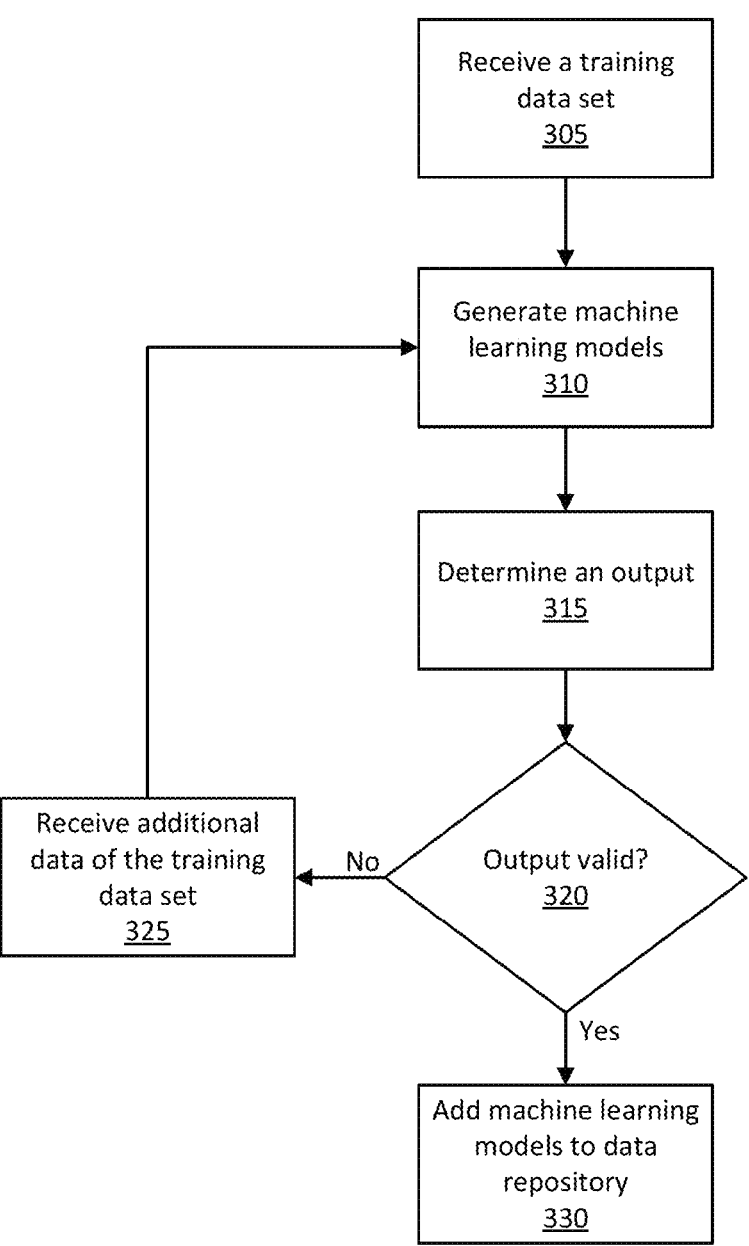
FIG. 3 depicts a method for training models to reduce carbon emissions using machine learning, in accordance with some implementations.

FIG. 3 depicts a method 300 for training models to reduce carbon emissions using machine learning, in accordance with some implementations. The method 300 can be performed by one or more system or component depicted in FIG. 1, FIG. 5, FIG. 6 or FIG. 7, including, for example, a data processing system. At ACT 305, the data processing system can receive a data set. The data set can be similar to data set 170 depicted in FIG. 1, or the data set received at 205. At ACT 310, the data processing system can generate one or more machine learning models. For example, the data processing system can generate the machine learning models using the model trainer 190 depicted in FIG. 1. At ACT 315, the data processing system can determine an output. The output can correspond to a performance or validity of the model. The output can be used to determine whether the model is sufficiently trained and ready to be deployed or used in an inference stage. The output can be a predicted output.

At ACT 320, the data processing system can determine whether the output is valid. The data processing system can compare the output with ground truth data or a holdover data set to determine whether the output from ACT 315 matches the expected value. If the output is satisfactory, then the data processing system can proceed to ACT 330 to add the machine learning model to the data repository or otherwise activate the model for inference or use by the data processing system. If, however, the data processing system determines the output is not valid, then the data processing system can proceed to ACT 325 to receive additional training data, and return to ACT 310 to re-train, tune, or otherwise update the model using machine learning.

FIG. 4 depicts an example operation 400 of a system for reducing carbon emissions, in accordance with some implementations. The operation 400 can be performed by one or more system or component depicted in FIG. 1, FIG. 5, FIG. 6 or FIG. 7, including, for example, a data processing system. The data processing system depicted in FIG. 1 can perform one or more function or include one or more component depicted in FIG. 4. At 405, the data processing system can perform data collection and integration, such as via data collector depicted in FIG. 1. At 410, the data processing system can perform data cleaning and reprocessing, such as via data collector. At 415, the data processing system can calculate carbon emissions. At 420, the data processing system can identify carbon planning algorithms, or other functions or models trained with machine learning. The carbon planning algorithms can include or be associated with actions.

For example, a carbon planning algorithm or function can include an optimization function or a machine learning model 175 that is trained and configured to optimize or otherwise reduce carbon emissions. The carbon planning function can input data into model 175 to generate an output that includes an action that reduces or otherwise controls carbon emissions. The carbon planning function (or carbon planning algorithm) can generate an action to be executed by a payroll planning system, for example. The action can adjust a compensation package for an employee of an organization such that the adjusted compensation package facilitates a reduction in carbon emissions associated with the employee (e.g., subsidize public transportation). Thus, the carbon planning function (e.g., which can include or utilize models 175) can generate an action to reduce carbon emissions.

At 425, the data processing system can invoke or access an employee engagement platform. At 430, the data processing system can perform carbon accounting or reporting. At 435, the data processing system can interface with a human resources system, such as a payroll processing system. At 440 the data processing system can access an API for third-party integration. An API can allow different systems or platforms to communicate and exchange data seamlessly may be used. The API leverages the identified datasets to be synchronized. The API includes authentication mechanisms and data validation to provide secure and accurate data exchange. The API allows real-time or scheduled synchronization of datasets, providing flexibility and efficiency for the overall technical solution.

At 445, the data processing system can include or execute security and access control functionality. At 450, the data processing system can scale up for performance optimization, such as by using virtual machines, or tuning models. For example, the data processing system can scale up processing supply responsive to a demand for such processing, thereby matching computing demand with supply to reduce processing latency or delays, without excessive or wasted energy consumption.

At 455, the data processing system can provide output, such as model output, values, reports, and other data visualization via graphical user interfaces. The dashboard can provide a holistic view of carbon emissions, compensation planning, or sustainability metrics. Employees or employers can track progress towards tailored carbon neutrality goals, view compensation-related data, or monitor sustainability initiatives via the dashboard.

The data processing system can receive the carbon neutrality goals via the graphical user interface. The dashboard provided be the data processing system can include an input graphical user element though which carbon neutrality goals can be provided, selected, or otherwise indicated by a client device or input device. The carbon neutrality goals can be a predetermined or preset list of goals. The dashboard can receive a value for a metric associated with the goal through a text box, slide bar, or other graphical user element configured to adjust values. Example carbon neutrality goals can include a reduction in carbon emissions by a percentage or absolute amount of carbon emissions, a number or percentage of employees that are associated with a carbon emissions by a percentage, a timeline for the carbon emissions, achieving net-zero, or other goals. The data processing system can receive the goal via the dashboard, and use the received goals to generate actions to reduce a metric associated with the goal (e.g., at ACT 215 depicted in FIG. 2).

The carbon emissions visualization can provide a personalized dashboard for an employee that displays carbon footprints based on job roles, activities, geography and departmental contributions. The dashboard can provide employers a visualization of carbon emissions across the organization, identifying areas for improvement and implementing targeted strategies to reduce environmental impact. The GUI can provide real-time feedback, as well as forecast future carbon trends to evaluate the effectiveness of compensation strategies.

Figure 5:
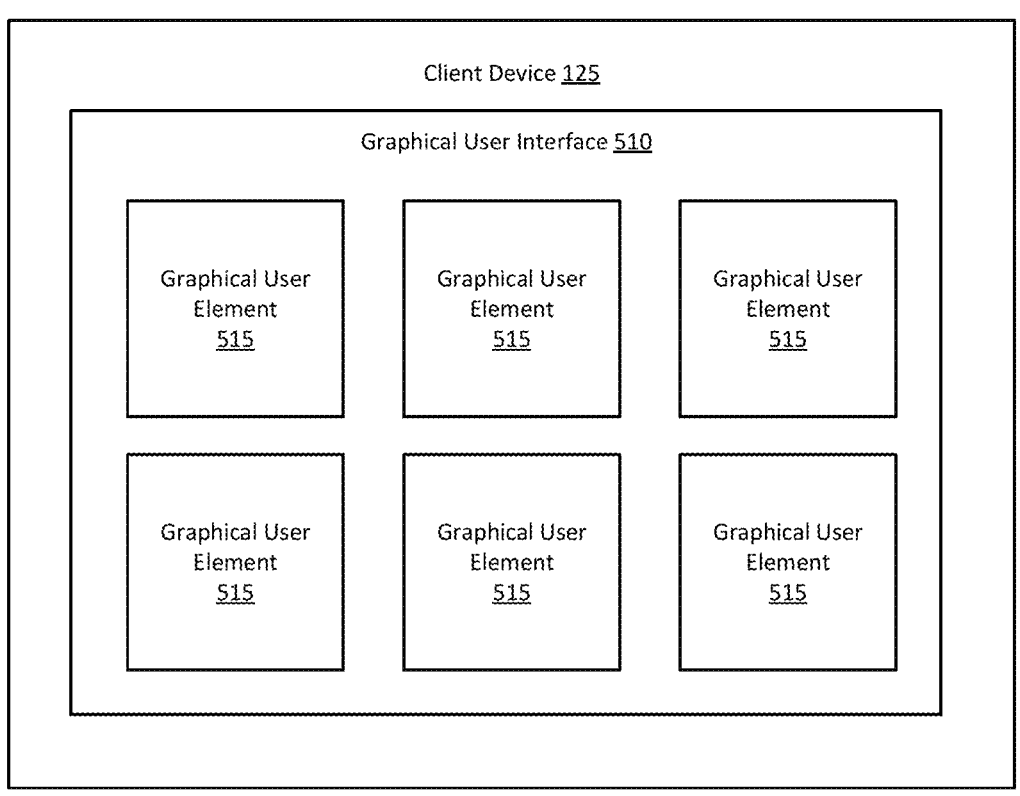
FIG. 5 depicts a graphical user interface to facilitate a reduction in carbon emissions using machine learning, in accordance with some implementations.

FIG. 5 depicts a graphical user interface to facilitate a reduction in carbon emissions using machine learning, in accordance with some implementations. The graphical user interface 510 can be rendered on a client device 125. The graphical user interface 510 can include various graphical user interface elements 515, which can depict actions, impact information, values, or any other data. The graphical user interface elements 515 can include interactive elements, such as buttons, dropdown menus, input text boxes, scroll bars, or other interactive functionality.

The dashboard 510 can include interactive charts and graphs to highlight trends and key performance indicators. For example, the data processing system can provide a line chart that displays historical carbon emissions data for the organization over time, segmented by department or employee roles. The data processing system 105 can display a pie chart that illustrates the distribution of carbon emissions across different aspects of the business, such as energy consumption, transportation, and supply chain.

The data processing system can display a bar chart that displays the average compensation packages for various job roles within the organization, with color coding to indicate the level of carbon impact associated with each role. The data processing system can display a scatter plot depicts the relationship between employee compensation and their respective carbon footprint, allowing users to identify outliers and areas for optimization.

The data processing system can display a stacked bar chart that depicts employee engagement with sustainability initiatives over time, showing participation rates in eco-friendly practices or training programs. The data processing system can display a heatmap that depicts employee sentiment towards carbon-neutral compensation packages, based on survey responses or feedback.

The data processing system can display a line chart with forecasted data that predicts future carbon emissions based on historical trends and anticipated changes in business operations. The data processing system can display a trend line overlaying actual versus predicted compensation data to illustrate the effectiveness of carbon-neutral incentive programs.

The data processing system can provide interactive features, including hovering over data points to view specific details or clicking on elements to drill down into deeper insights. The data processing system can provide dropdown menus or filters that users can use to customize the data displayed based on different criteria, such as department, time period, or employee demographics.

Figure 6:
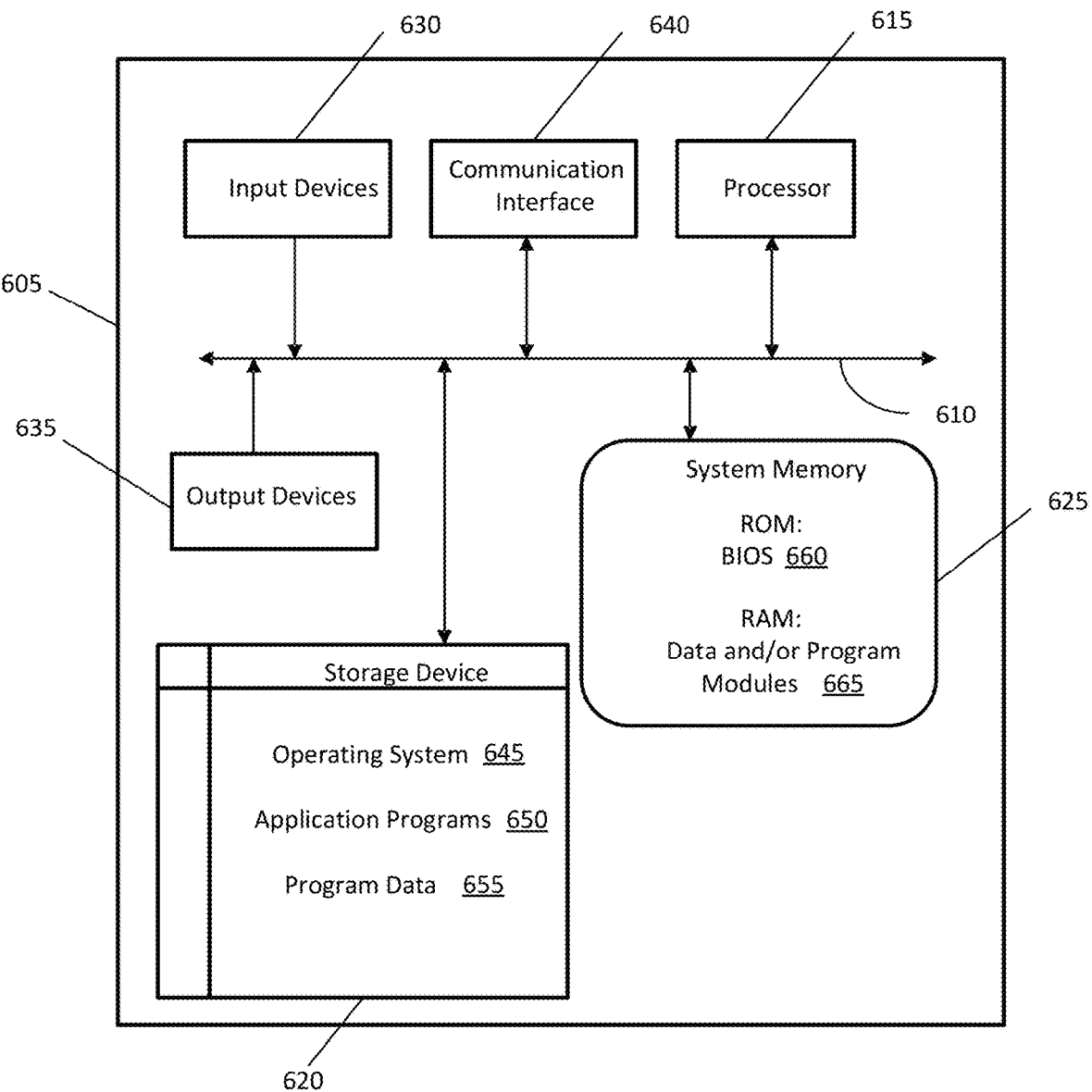
FIG. 6 depicts an illustrative architecture of a computing system implemented in embodiments of the technical solutions described herein.
Figure 7:
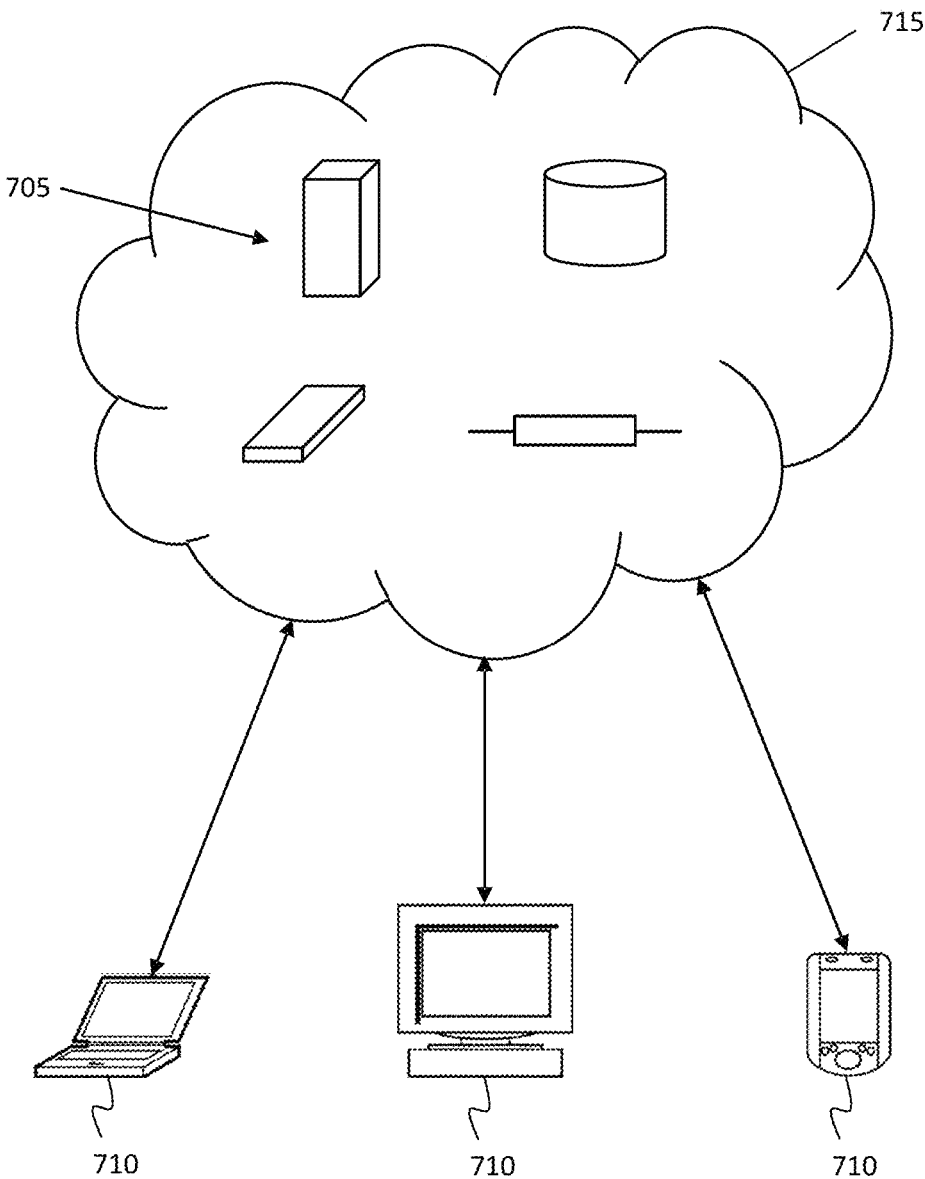
FIG. 7 shows an exemplary cloud computing environment in accordance with aspects of the technical solutions described herein.

As shown in FIG. 6, computing system 600 includes a computing device 605. The computing device 605 can be resident on a network infrastructure such as within a cloud environment as shown in FIG. 7, or can be a separate independent computing device (e.g., a computing device of a third party service provider). The computing device 605 can include a bus 610, a processor 615, a storage device 620, a system memory (hardware device) 625, one or more input devices 630, one or more output devices 635, and a communication interface 640. One or more component of the computing system 600 can be part of or form the data processing system 105.

The bus 610 permits communication among the components of computing device 605. For example, bus 610 can be any of several types of bus structures including a memory bus or memory controller, a peripheral bus, and a local bus using any of a variety of bus architectures to provide one or more wired or wireless communication links or paths for transferring data and/or power to, from, or between various other components of computing device 605.

The processor 615 can be one or more processors or microprocessors that include any processing circuitry operative to interpret and execute computer readable program instructions, such as program instructions for controlling the operation and performance of one or more of the various other components of computing device 605. In embodiments, processor 615 interprets and executes the processes, steps, functions, and/or operations of the technical solutions described herein, which can be operatively implemented by the computer readable program instructions.

For example, processor 615 provides an enterprise-wide security approach with all stakeholders (e.g., Dev teams, leadership, CSO office, etc.) with a set of various security scanner types and information sources integrated into a single tool. In embodiments, the processor 615 uniformly integrates or packages existing scanner types into a single tool that standardizes and visually displays the output over different development teams for different scanner types. The scanner types which are packaged into the integrated security tool can capture specific requirements of the different teams, i.e., ensures that the tools support varied team development methodologies and different tech stacks to capture required security vulnerabilities. The processor 615 also establishes a regular feedback mechanism, and can be used to develop a process for remediation timelines and priority including at risk vulnerabilities.

In embodiments, processor 615 can receive input signals from one or more input devices 630 and/or drive output signals through one or more output devices 635. The input devices 630 can be, for example, a keyboard, touch sensitive user interface (UI), etc., as is known to those of skill in the art such that no further description is required for a complete understanding of the technical solutions described herein. The output devices 635 can be, for example, any display device, printer, etc., as is known to those of skill in the art such that no further description is required for a complete understanding of the technical solutions described herein.

The storage device 620 can include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 605 in accordance with the different aspects of the technical solutions described herein. In embodiments, storage device 620 can store operating system 645, application programs 650, and program data 655 in accordance with aspects of the technical solutions described herein.

The system memory 625 can include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 660 (BIOS) including the basic routines that help to transfer information between the various other components of computing device 605, such as during start-up, can be stored in the ROM. Additionally, data and/or program modules 665, such as at least a portion of operating system 645, application programs 650, and/or program data 655, that are accessible to and/or presently being operated on by processor 615 can be contained in the RAM.

The communication interface 640 can include any transceiver-like mechanism (e.g., a network interface, a network adapter, a modem, or combinations thereof) that enables computing device 605 to communicate with remote devices or systems, such as a mobile device or other computing devices such as, for example, a server in a networked environment, e.g., cloud environment. For example, computing device 605 can be connected to remote devices or systems via one or more local area networks (LAN) and/or one or more wide area networks (WAN) using communication interface 640.

As discussed herein, computing system 600 can be configured to integrate different scanner types into a single workbench or tool. This allows developers and other team members a uniform approach to assessing security vulnerabilities in a code throughout the enterprise. In particular, computing device 605 can perform tasks (e.g., process, steps, methods and/or functionality) in response to processor 615 executing program instructions contained in a computer readable medium, such as system memory 625. The program instructions can be read into system memory 625 from another computer readable medium, such as data storage device 620, or from another device via the communication interface 640 or server within or outside of a cloud environment. In embodiments, an operator can interact with computing device 605 via the one or more input devices 630 and/or the one or more output devices 635 to facilitate performance of the tasks and/or realize the end results of such tasks in accordance with aspects of the technical solutions described herein. In additional or alternative embodiments, hardwired circuitry can be used in place of or in combination with the program instructions to implement the tasks, e.g., steps, methods and/or functionality, consistent with the different aspects of the technical solutions described herein. Thus, the steps, methods and/or functionality described herein can be implemented in any combination of hardware circuitry and software.

FIG. 7 shows an exemplary cloud computing environment 700 in accordance with aspects of the technical solutions described herein. In embodiments, one or more aspects, functions and/or processes described herein can be performed and/or provided via cloud computing environment 700. As depicted in FIG. 7, cloud computing environment 700 includes cloud resources 705 that are made available to client devices 710 via a network 715, such as the Internet. Cloud resources 705 can be on a single network or a distributed network. Cloud resources 705 can be distributed across multiple cloud computing systems and/or individual network enabled computing devices. Cloud resources 705 can include a variety of hardware and/or software computing resources, such as servers, databases, storage, networks, applications, and platforms that perform the functions provided herein including storing code, running scanner types and provided an integration of plural scanner types into a uniform and standardized application, e.g., display.

Client devices 710 can comprise any suitable type of network-enabled computing device, such as servers, desktop computers, laptop computers, handheld computers (e.g., smartphones, tablet computers), set top boxes, and network-enabled hard drives. Cloud resources 705 are typically provided and maintained by a service provider so that a client does not need to maintain resources on a local client device 710. In embodiments, cloud resources 705 can include one or more computing system 600 of FIG. 6 that is specifically adapted to perform one or more of the functions and/or processes described herein.

Cloud computing environment 700 can be configured such that cloud resources 705 provide computing resources to client devices 710 through a variety of service models, such as Software as a Service (SaaS), Platforms as a service (PaaS), Infrastructure as a Service (IaaS), and/or any other cloud service models. Cloud resources 705 can be configured, in some cases, to provide multiple service models to a client device 710. For example, cloud resources 705 can provide both SaaS and IaaS to a client device 710. Cloud resources 705 can be configured, in some cases, to provide different service models to different client devices 710. For example, cloud resources 705 can provide SaaS to a first client device 710 and PaaS to a second client device 710.

Cloud computing environment 700 can be configured such that cloud resources 705 provide computing resources to client devices 710 through a variety of deployment models, such as public, private, community, hybrid, and/or any other cloud deployment model. Cloud resources 705 can be configured, in some cases, to support multiple deployment models. For example, cloud resources 705 can provide one set of computing resources through a public deployment model and another set of computing resources through a private deployment model.

In embodiments, software and/or hardware that performs one or more of the aspects, functions and/or processes described herein can be accessed and/or utilized by a client (e.g., an enterprise or an end user) as one or more of a SaaS, PaaS and IaaS model in one or more of a private, community, public, and hybrid cloud. Moreover, although aspects of the technical solutions described herein include a description of cloud computing, the systems and methods described herein are not limited to cloud computing and instead can be implemented on any suitable computing environment.

Cloud resources 705 can be configured to provide a variety of functionality that involves user interaction. Accordingly, a user interface (UI) can be provided for communicating with cloud resources 705 and/or performing tasks associated with cloud resources 705. The UI can be accessed via a client device 710 in communication with cloud resources 705. The UI can be configured to operate in a variety of client modes, including a fat client mode, a thin client mode, or a hybrid client mode, depending on the storage and processing capabilities of cloud resources 705 and/or client device 710. Therefore, a UI can be implemented as a standalone application operating at the client device in some embodiments. In other embodiments, a web browser-based portal can be used to provide the UI. Any other configuration to access cloud resources 705 can also be used in various implementations.

The foregoing examples have been provided merely for the purpose of explanation and are in no way to be construed as limiting of the present description. While aspects of the technical solutions described herein have been described with reference to an exemplary embodiment, it is understood that the words which have been used herein are words of description and illustration, rather than words of limitation. Changes can be made, within the purview of the appended claims, as presently stated and as amended, without departing from the scope and spirit of the technical solutions described herein in their aspects. Although aspects of the technical solutions have been described herein with reference to particular means, materials and embodiments, the present description is not intended to be limited to the particulars described herein; rather, the technical solutions described herein extend to all functionally equivalent structures, methods and uses, such as are within the scope of the appended claims.

Although an example computing system has been described in FIG. 9, the subject matter including the operations described in this specification can be implemented in other types of digital electronic circuitry, or in computer software, firmware, or hardware, including the structures described in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures described in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently described systems or methods, their components, acts, or elements to single or plural configurations. References to any act or element being based on any information, act or element may include implementations where the act or element is based at least in part on any information, act, or element.

Any implementation described herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations described herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the described elements and operations without departing from the scope of the technical solutions described herein.

References to "approximately," "substantially", or other terms of degree include variations of +/−10% from the given measurement, unit, or range unless explicitly indicated otherwise. Coupled elements can be electrically, mechanically, or physically coupled with one another directly or with intervening elements. Scope of the Systems and methods described herein is thus indicated by the appended claims, rather than the foregoing description, and changes that come within the meaning and range of equivalency of the claims are embraced therein.

What is claimed is:

1. A system, comprising:
one or more processors, coupled with memory, to:
receive, from a payroll processing system, data of a plurality of profiles associated with one or more locations of an entity, wherein (i) each of the plurality of profiles is associated with a respective employee of the one or more locations of the entity, (ii) the data is indicative of energy consumption of the respective employee associated with each of the plurality of profiles associated with the one or more locations of the entity, and (iii) each of the plurality of profiles comprises financial information of the respective employee;
determine, based at least in part on data from a utility service provider system for the one or more locations of the entity, the financial information of the respective employee associated with each of the plurality of profiles, and the data indicative of energy consumption of the respective employee associated with each of the plurality of profiles associated with the one or more locations of the entity, a first value of a metric indicative of carbon emissions associated with employees of the one or more locations of the entity;
identify, using one or more models trained with machine learning on first historical data received from the payroll processing system and second historical data received from the utility service provider system, a first amount of the carbon emissions associated with the employees of the one or more locations of the entity that negatively impacts a performance of operations of the entity;
generate, using the one or more models, a threshold indicative of a second amount of the carbon emissions associated with the employees of the one or more locations of the entity, wherein the second amount indicated by the threshold is greater than the first amount that negatively impacts the performance of the operations of the entity;

determine, based on a comparison of the first value of the metric with the threshold, to invoke an automated process via the payroll processing system to reduce the metric;

generate, using the one or more models, an action to execute via the automated process that is configured to modify the financial information of at least one employee associated with at least one of the plurality of profiles to reduce the first value of the metric indicative of the carbon emissions associated with the employees of the one or more locations of the entity and carbon emissions associated with the one or more locations of the entity;

compare, using the one or more models, the data of the plurality of profiles to the first value of the metric;

select, using the one or more models, a first profile associated with a first employee from the plurality of profiles, responsive to the data of the first profile being associated with the first value of the metric; and command, via the automated process, the payroll processing system to execute the action for the first profile to modify the financial information of the first employee associated with the first profile to cause a reduction in the first value of the metric and the carbon emissions associated with the one or more locations of the entity between the second amount indicated by the threshold and the first amount that negatively impacts the performance of the operations of the entity.

2. The system of claim 1, comprising the one or more processors to:

determine, via the automated process, a benefit correlated to the first employee of the first profile; and command, via the automated process, responsive to performance of the action, the payroll processing system to execute a second action associated with the benefit.

3. The system of claim 1, comprising the one or more processors to:

identify, based at least in part on the data indicative of energy consumption of the respective employee associated with each of the plurality of profiles associated with the one or more locations of the entity and the data from the utility service provider system for the one or more locations of the entity, a second value of a second metric indicative of computing resource utilization of the one or more locations of the entity;

generate, using the one or more models, a second action to execute via the automated process that is configured to modify the financial information of at least one employee associated with at least one of the plurality of profiles to reduce the second value of the second metric;

select, using the one or more models, a second profile associated with a second employee from the plurality of profiles, wherein the second employee is associated with the one or more locations of the entity; and command, via the automated process, the payroll processing system to execute the second action for the second profile to modify the financial information of the second employee associated with the second profile to cause a reduction in the second value of the second metric.

4. The system of claim 1, wherein the data indicative of energy consumption of the respective employee associated with each of the plurality of profiles associated with the one or more locations of the entity comprise at least one of:

energy consumption metrics;

carbon offset initiatives established by the entity;

payroll data elements;

employment turnover metrics;

transportation metrics; or supply chain metrics.

5. The system of claim 1, comprising the one or more processors to:

determine, using the one or more models, an industry of the entity; and determine, using natural language processing, the threshold based on one or more benchmarks indicative of carbon emission standards for the industry.

6. The system of claim 5, comprising the one or more processors to:

determine, using the natural language processing, a second benchmark indicative of carbon emission standards for the one or more locations of the entity; and select, using the one or more models, the threshold according to the one or more benchmarks and the second benchmark.

7. The system of claim 1, comprising the one or more processors to:

determine, based at least in part on the data from the utility service provider system for the one or more locations of the entity, the financial information associated with each of the plurality of profiles, and the data indicative of energy consumption of the respective employee associated with each of the plurality of profiles associated with the one or more locations of the entity, a second value of the metric, wherein the second value of the metric is less than the first value of the metric; and generate, based on a comparison of the second value of the metric with the threshold, a second action to cause a further reduction in the metric.

8. The system of claim 1, comprising the one or more processors to:

identify, using the one or more models, a second profile associated with a second employee from the first profile, the first profile comprising a second plurality of profiles, wherein each of the second plurality of profiles is associated with the respective employee of the one or more locations of the entity;

determine, using the one or more models, a second value of the metric indicative of carbon emissions associated with the second profile;

generate, based on a second comparison of the second value of the metric and the action, a second action that is configured to modify the financial information of at least one employee associated with at least one of the plurality of profiles or the second plurality of profiles to reduce the second value of the metric and the carbon emissions associated with the one or more locations of the entity;

command, via the automated process, the payroll processing system to execute the second action for the second profile to modify the financial information of the second employee associated with the second profile to cause a reduction in the second value of the metric and the carbon emissions associated with the one or more locations of the entity; and command, via the automated process, the payroll processing system to replace the action with the second action to modify the financial information of the first employee associated with the first profile cause the reduction in the carbon emissions associated with the one or more locations of the entity linked with the first profile.

9. The system of claim 1, comprising the one or more processors to:

determine, using the one or more models, an impact on the first value of the metric associated with the one or more locations of the entity caused by an application of the action to the one or more locations of the entity.

10. The system of claim 1, comprising the one or more processors to:

receive, from the payroll processing system, second data of the plurality of profiles linked with the one or more locations of the entity, wherein the second data is indicative of energy consumption of the respective employee associated with each of the plurality of profiles associated with the one or more locations of the entity subsequent to completion of the action;

determine, based at least in part on second data from the utility service provider system for the one or more locations of the entity, the financial information associated with each of the plurality of profiles, and the second data indicative of energy consumption of the respective employee associated with each of the plurality of profiles associated with the one or more locations of the entity, a second value of the metric;

compare, using the one or more models, the second value of the metric with the threshold;

generate, using the one or more models, a second action to execute via the automated process subsequent to a determination that the second value of the metric is greater than the threshold;

compare, using the one or more models, the data of the plurality of profiles to the second value of the metric;

select, using the one or more models, a second profile associated with a second employee from the plurality of profiles responsive to the data of the second profile being associated with the second value of the metric; and command, via the automated process, the payroll processing system to execute the second action for the second profile to modify the financial information of the second employee associated with the second profile to cause a second reduction in the second value of the metric and the carbon emissions associated with the one or more locations of the entity.

11. The system of claim 1, comprising the one or more processors to:

receive, from the payroll processing system, second data indicative of energy consumption of the respective employee associated with each of the plurality of profiles associated with the one or more locations of the entity;

determine, based in part on data from the utility service provider system and the second data indicative of energy consumption of the respective employee associated with each of the plurality of profiles associated with the one or more locations of the entity, an impact to the first value of the metric; and display, via a graphical user interface, the impact.

12. The system of claim 1, comprising the one or more processors to:

generate, using the one or more models, a plurality of actions that are configured to reduce the first value of the metric;

determine, using the one or more models, an impact to the first value of the metric for each of the plurality of actions;

display, via a graphical user interface, the plurality of actions as a plurality of graphical user elements, wherein each of the plurality of graphical user elements corresponds to one of the plurality of actions;

arrange, via the graphical user interface, the plurality of graphical user elements according to the impact to the first value of the metric determined for each of the plurality of actions; and receive, via the graphical user interface, a selection of one of the plurality of graphical user elements.

13. The system of claim 1, comprising the one or more processors to:

analyze, using the one or more models, the data indicative of energy consumption of the respective employee associated with each of the plurality of profiles associated with the one or more locations of the entity or the data from the utility service provider system for the one or more locations of the entity to determine an inconsistency within the data indicative of energy consumption of the respective employee associated with each of the plurality of profiles associated with the one or more locations of the entity or the data from the utility service provider system for the one or more locations of the entity; and remove, using the one or more models, the inconsistency from the data indicative of energy consumption of the respective employee associated with each of the plurality of profiles associated with the one or more locations of the entity or the data from the utility service provider system of the one or more locations of the entity to cleanse the data indicative of energy consumption of the respective employee associated with each of the plurality of profiles associated with the one or more locations of the entity or the data from the utility service provider system for the one or more locations of the entity.

14. A method, comprising:

receiving, by one or more processors coupled with memory, first data of a plurality of profiles associated with one or more locations of an entity, wherein (i) each of the plurality of profiles is associated with a respective employee of the one or more locations of the entity, (ii) the first data is indicative of energy consumption of the respective employee associated with each of the plurality of profiles associated with the one or more locations of the entity, and (iii) each of the plurality of profiles comprises financial information of the respective employee;

determining, by the one or more processors, based at least in part on second data from a utility service provider system for the one or more locations of the entity, the financial information of the respective employee associated with each of the plurality of profiles, and the first data indicative of energy consumption of the respective employee associated with each of the plurality of profiles associated with the one or more locations of the entity, a first value of a metric indicative of carbon emissions associated with employees of the one or more locations of the entity;

identifying, by the one or more processors, using one or more models trained with machine learning on first historical data received from a payroll processing system and second historical data received from the utility service provider system, a first amount of the carbon emissions associated with the employees of the one or more locations of the entity that negatively impacts a performance of operations of the entity;

generating, by the one or more processors, using the one or more models, a threshold indicative of a second amount of the carbon emissions associated with the employees of the one or more locations of the entity, wherein the second amount indicated by the threshold is greater than the first amount that negatively impacts the performance of the operations of the entity;

determining, by the one or more processors, based on a comparison of the first value of the metric with the threshold, to execute an automated process via the payroll processing system to reduce the metric;

generating, by the one or more processors, using the one or more models, an action to execute via the automated process that is configured to modify the financial information of at least one employee associated with at least one of the plurality of profiles to reduce the first value of the metric indicative of the carbon emissions associated with the employees of the one or more locations of the entity and carbon emissions associated with the one or more locations of the entity;

comparing, by the one or more processors, the first data of the plurality of profiles to the first value of the metric;

selecting, by the one or more processors, using the one or more models, a first profile associated with a first employee from the plurality of profiles, responsive to the first data of the first profile being associated with the first value of the metric; and commanding, by the one or more processors, via the automated process, the payroll processing system to execute the action to the first profile to modify the financial information of the first employee associated with the first profile to cause a reduction in the carbon emissions associated with the one or more locations of the entity linked with the first profile between the second amount indicated by the threshold and the first amount that negatively impacts the performance of the operations of the entity.

15. The method of claim 14, comprising:

determining, by the one or more processors, via the automated process, a benefit correlated to the first employee of the first profile; and commanding, by the one or more processors, via the automated process, responsive to a determination that the action was completed, the payroll processing system to execute a second action associated with the benefit.

16. The method of claim 14, comprising:

identifying, by the one or more processors, based at least in part on the first data indicative of energy consumption of the respective employee associated with each of the plurality of profiles associated with the one or more locations of the entity and the second data from the utility service provider system for the one or more locations of the entity, a second value of a second metric indicative of computing resource utilization of the one or more locations of the entity;

generating, by the one or more processors, using the one or more models, a second action to execute via the automated process that is configured to modify the financial information of at least one employee associated with at least one of the plurality of profiles to reduce the second value of the second metric;

comparing, by the one or more processors, using the one or more models, the first data of the plurality of profiles to the first value of the metric;

selecting, by the one or more processors, using the one or more models, a second profile associated with a second employee from the plurality of profiles, responsive to the first data of the second profile being associated with the second value of the metric; and commanding, by the one or more processors, via the automated process, the payroll processing system to execute the second action for the second profile to modify the financial information of the second employee associated with the second profile to cause a reduction in the second value of the second metric.

17. The method of claim 14, comprising:

determining, by the one or more processors, via the one or more models from the payroll processing system, an industry of the entity; and selecting, by the one or more processors, using the one or more models, the threshold through natural language processing of one or more benchmarks indicative of carbon emission standards for the industry.

18. The method of claim 14, comprising:

determining, by the one or more processors, using the one or more models, an impact on the first value of the metric associated with the one or more locations of the entity caused by an application of the action to the one or more locations of the entity.

19. A non-transitory computer-readable medium comprising instructions embodied thereon, the instructions to cause a processor to:

receive first data of a plurality of profiles associated with one or more locations of an entity, wherein i) each of the plurality of profiles is associated with a respective employee of the one or more locations of the entity, (ii) the first data is indicative of energy consumption of the respective employee associated with each of the plurality of profiles associated with the one or more locations of the entity, and (iii) each of the plurality of profiles comprises financial information of the respective employee;

determine, based at least in part on the first data indicative of energy consumption of the respective employee associated with each of the plurality of profiles associated with the one or more locations of the entity and the financial information of the respective employee associated with each of the plurality of profiles, a first value of a metric indicative of carbon emissions associated with employees of the one or more locations of the entity;

identify, using one or more models trained with machine learning on first historical data received from a payroll processing system and second historical data received from a utility service provider system, a first amount of the carbon emissions associated with the employees of the one or more locations of the entity that negatively impacts a performance of operations of the entity:

generate, using the one or more models, a threshold indicative of a second amount of the carbon emissions associated with the employees of the one or more locations of the entity, wherein the second amount indicated by the threshold is greater than the first amount that negatively impacts the performance of the operations of the entity;

determine, based on a comparison of the first value of the metric with the threshold, to execute an automated process via the payroll processing system to reduce the metric;

generate, using the one or more models, an action to execute via the automated process that is configured modify the financial information of at least one employee associated with at least one of the plurality of profiles to reduce the first value of the metric indicative of the carbon emissions associated with the employees of the one or more locations of the entity and carbon emissions associated with the one or more locations of the entity;

compare, using the one or more models, the first data of the plurality of profiles to the first value of the metric;

select, using the one or more models, a first profile associated with a first employee from the plurality of profiles, responsive to the first data of the first profile being associated with the first value of the metric; and command, via the automated process, the payroll processing system to execute the action for the first profile to modify the financial information of the first employee associated with the first profile to cause a reduction in the first value of the metric and the carbon emissions associated with the one or more locations of the entity between the second amount indicated by the threshold and the first amount that negatively impacts the performance of the operations of the entity.

20. The non-transitory computer-readable medium of claim 19, comprising the instructions embodied thereon to cause the processor to:

determine, via the automated process, a benefit correlated to the first employee associated with the first profile; and command, via the automated process, responsive to a determination that the action was completed, the payroll processing system to execute a second action associated with the benefit.

* * * * *